(12) United States Patent
Komatsu

(10) Patent No.: US 10,129,440 B2
(45) Date of Patent: Nov. 13, 2018

(54) IMAGE PROCESSING APPARATUS, IMAGE PROCESSING METHOD, AND RECORDING MEDIUM

(71) Applicant: Manabu Komatsu, Tokyo (JP)

(72) Inventor: Manabu Komatsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/637,106

(22) Filed: Jun. 29, 2017

(65) Prior Publication Data

US 2018/0013924 A1    Jan. 11, 2018

(30) Foreign Application Priority Data

Jul. 5, 2016 (JP) ................. 2016-133775

(51) Int. Cl.
H04N 1/60 (2006.01)
H04N 1/00 (2006.01)

(52) U.S. Cl.
CPC .......... *H04N 1/603* (2013.01); *H04N 1/00005* (2013.01); *H04N 1/00023* (2013.01); *H04N 1/00082* (2013.01); *H04N 1/6038* (2013.01); *H04N 1/6075* (2013.01)

(58) Field of Classification Search
CPC combination set(s) only.
See application file for complete search history.

(56) References Cited

U.S. PATENT DOCUMENTS

| | | | |
|---|---|---|---|
| 5,831,751 A | 11/1998 | Ohneda et al. | |
| 6,016,359 A | 1/2000 | Komatsu | |
| 7,545,536 B2 | 6/2009 | Hayashi | |
| 7,710,600 B2 | 5/2010 | Miyahara et al. | |
| 8,072,645 B2 | 12/2011 | Komatsu | |
| 8,243,308 B2 | 8/2012 | Komatsu | |
| 9,204,017 B2 | 12/2015 | Komatsu | |
| 2005/0008258 A1 | 1/2005 | Suzuki et al. | |
| 2007/0058224 A1 | 3/2007 | Kawamoto et al. | |
| 2007/0064267 A1 | 3/2007 | Murakata et al. | |
| 2007/0086068 A1 | 4/2007 | Ohkawa et al. | |
| 2007/0226692 A1 | 9/2007 | Nozawa | |
| 2009/0231645 A1* | 9/2009 | Hayashi | H04N 1/00002 358/520 |

FOREIGN PATENT DOCUMENTS

| | | |
|---|---|---|
| JP | 2002-262007 | 9/2002 |
| JP | 4607723 | 1/2011 |

* cited by examiner

*Primary Examiner* — Helen Zong
(74) *Attorney, Agent, or Firm* — IPUSA, PLLC

(57) ABSTRACT

An image processing apparatus performs color adjustment based on an original document read by a reading device. The image processing apparatus includes an image data acquirer configured to acquire image data that is generated as the reading device reads a gradation pattern formed on a recording sheet; a density corrector configured to extract, from the image data, a color component by which a read value of a process color changes according to variations in a total spectral sensitivity characteristic of the reading device, and correct a read value of the color component to a reference density; and a color adjuster configured to perform the color adjustment on the color component, based on a difference between the read value of the color component that has been corrected to the reference density and a read value that is a reference of the reading device.

5 Claims, 19 Drawing Sheets

FIG.10

| | COLOR | SCANNER VECTOR | PRINTER VECTOR |
|---|---|---|---|
| ACHROMATIC | W | (Wr, Wg, Wb) | (Wc, Wm, Wy, Wk) |
| ″ | K | (Kr, Kg, Kb) | (Kc, Km, Ky, Kk) |
| CHROMATIC | Rm | (Rmr, Rmg, Rmb) | (Rmc, Rmm, Rmy, Rmk) |
| ″ | Ry | (Ryr, Ryg, Ryb) | (Ryc, Rym, Ryy, Ryk) |
| ″ | Yr | (Yrr, Yrg, Yrb) | (Yrc, Yrm, Yry, Yrk) |
| ″ | Yg | (Ygr, Ygg, Ygb) | (Ygc, Ygm, Ygy, Ygk) |
| ″ | Gy | (Gyr, Gyg, Gyb) | (Gyc, Gym, Gyy, Gyk) |
| ″ | Gc | (Gcr, Gcg, Gcb) | (Gcc, Gcm, Gcy, Gck) |
| ″ | Cg | (Cgr, Cgg, Cgb) | (Cgc, Cgm, Cgy, Cgk) |
| ″ | Cb | (Cbr, Cbg, Cbb) | (Cbc, Cbm, Cby, Cbk) |
| ″ | Bc | (Bcr, Bcg, Bcb) | (Bcc, Bcm, Bcy, Bck) |
| ″ | Bm | (Bmr, Bmg, Bmb) | (Bmc, Bmm, Bmy, Bmk) |
| ″ | Mb | (Mbr, Mbg, Mbb) | (Mbc, Mbm, Mby, Mbk) |
| ″ | Mr | (Mrr, Mrg, Mrb) | (Mrc, Mrm, Mry, Mrk) |

IMAGE PROCESSING APPARATUS, IMAGE PROCESSING METHOD, AND RECORDING MEDIUM

CROSS-REFERENCE TO RELATED APPLICATION

The present application claims priority under 35 U.S.C. § 119 to Japanese Patent Application No. 2016-133775, filed on Jul. 5, 2016, the contents of which are incorporated herein by reference in their entirety.

BACKGROUND OF THE INVENTION

1. Field of the Invention

The present invention relates to an image processing apparatus, an image processing method, and a recording medium.

2. Description of the Related Art

There are cases where color image data, which is obtained by computerizing an image read from an original document by a color image scanner, is output by an output device such as a printing machine. The color of the original document, which has been read by the color image scanner, and the color of color printed matter, which has been output by the output device, generally do not match each other completely. That is, in order to match the colors of the original document and the printed matter, it is often necessary for an image processing apparatus to perform color correction with respect to the color image data read by the color image scanner.

There is known a calibration technology of the color image scanner for performing color correction on the color image data. Specifically, the color image scanner detects the impact of characteristic variations of the components forming the color image scanner and changes in the components due to the passage of time, on the color image data. Then, the color image scanner removes this detected impact by adjusting the color correction parameters (see, for example, Patent Document 1). Patent Document 1 discloses a system of correcting the individual differences of scanner characteristics with respect to a plurality of hue regions, based on scanner read values obtained by reading a reference chart including a plurality of color patches and reference data stored in advance.

Patent Document 1: Japanese Patent No. 4607723

SUMMARY OF THE INVENTION

An aspect of the present invention provides an image processing apparatus, an image processing method, and a recording medium in which one or more of the disadvantages of the related art are reduced.

According to one aspect of the present invention, there is provided an image processing apparatus for performing color adjustment based on an original document read by a reading device, the image processing apparatus including an image data acquirer configured to acquire image data that is generated as the reading device reads a gradation pattern formed on a recording sheet; a density corrector configured to extract, from the image data, a color component by which a read value of a process color changes according to variations in a total spectral sensitivity characteristic of the reading device, and correct a read value of the color component to a reference density; and a color adjuster configured to perform the color adjustment on the color component, based on a difference between the read value of the color component that has been corrected to the reference density and a read value that is a reference of the reading device.

BRIEF DESCRIPTION OF THE DRAWINGS

Other objects, features and advantages of the present invention will become more apparent from the following detailed description when read in conjunction with the accompanying drawings, in which:

FIG. 10 is an example of a diagram for describing parameters used in the scanner color conversion according to an embodiment of the present invention;

DETAILED DESCRIPTION OF THE PREFERRED EMBODIMENTS

In the calibration system with respect to color reproducibility of the color image scanner of the related art, there has been a problem in that a reference chart in which colors are managed is required. That is, the color image scanner of the related art is based on the assumption that the reference chart is printed out and read. The reference chart is not only used by a customer engineer, etc., on the customer side to make adjustments, but the reference chart in which colors are managed is also required to make adjustments in the manufacturing process. Accordingly, there is an increase in the working hours spent on managing the reference chart and using the reference chart. Therefore, the cost relevant to the calibration of the color image scanner tends to increase.

A problem to be solved by an embodiment of the present invention is to provide an image processing system that can perform color correction without a reference chart in which colors are managed.

Embodiments of the present invention will be described by referring to the accompanying drawings.

<Overview of Color Correction>

Figure 1A:
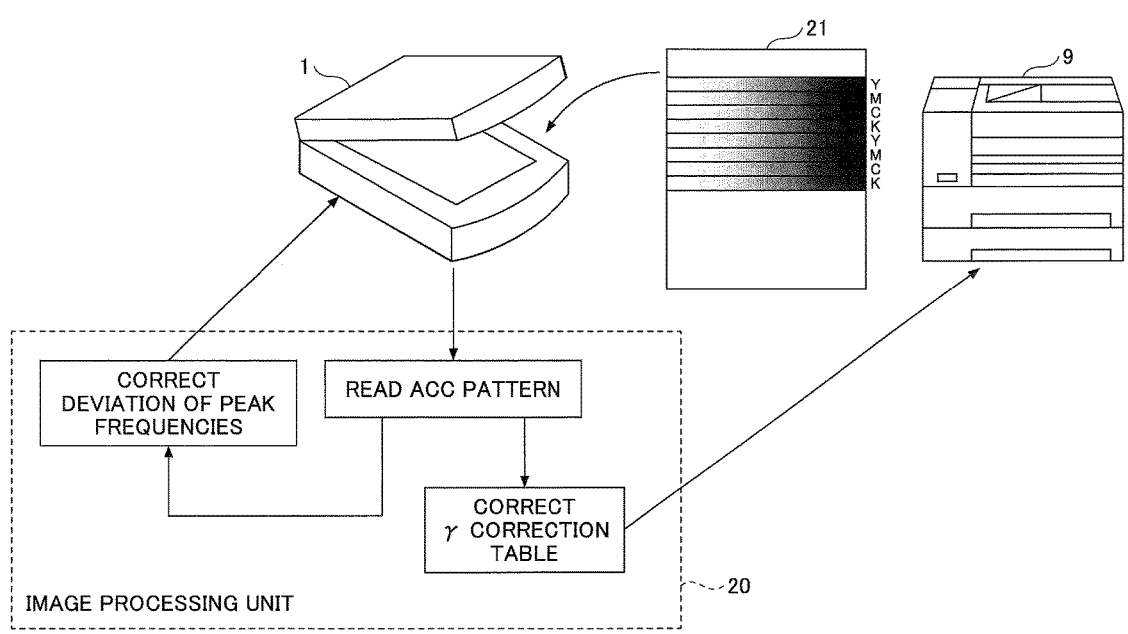
FIGS. 1A and 1B are examples of diagrams for schematically describing the overview of color correction according to an embodiment of the present invention.

FIG. 1A is an example of a diagram for schematically describing the overview of color correction according to the present embodiment. A reading device 1 such as a color image scanner reads an auto color calibration (ACC) pattern 21 (gradation pattern) printed by a plotter device 9. The reading device 1 includes an image processing unit 20. The image processing unit 20 performs various correction processes, etc., on the image data that has been read. According to one of these correction processes, a γ correction table is calculated, and the plotter device 9 records the image on a recording sheet based on the gamma correction table.

The reading device 1 reads color image data having the three colors of R (red), G (green), and B (blue) (hereinafter referred to as "RGB data"), and the image processing unit 20 performs color conversion to convert this image data into color image data having the four colors of C (cyan), M (magenta), Y (yellow), and Bk (black) (hereinafter referred to as "CMYK data"). The CMYK data is used in the process of image formation, and therefore there are cases where the CMYK data is referred to as process colors. The plotter device 9 outputs a color image on a recording sheet based on the CMYK data.

Figure 1B:
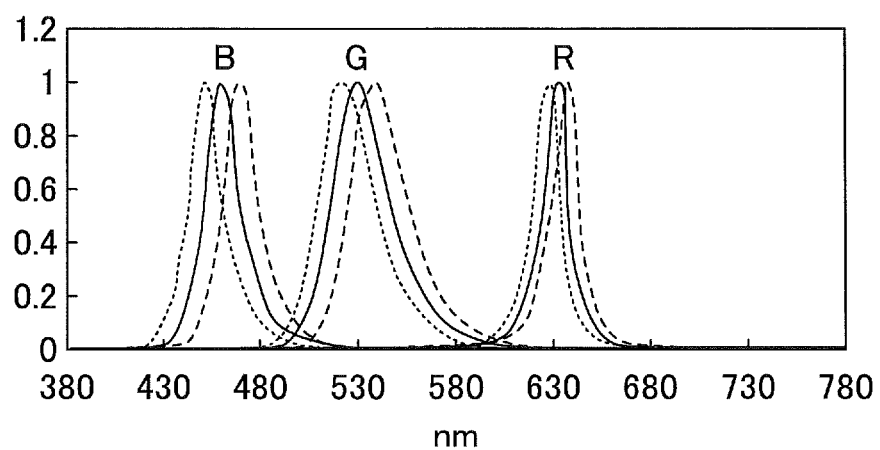

A controller 40 (see FIG. 5) causes the plotter device 9 to output the ACC pattern 21 for calibration for a plotter. Then, only when there has been a request for calibration for a scanner, the controller 40 corrects the deviations of peak frequencies among the light sources of R (red), G (green), and B (blue), based on the image data of the ACC pattern 21 read by the reading device 1. FIG. 1B illustrates the variations in light sources of a line sequence contact image sensor (CIS) scanner. As illustrated in FIG. 1B, the wavelengths of the light-emitting diode (LED) light sources of the three colors (wavelengths corresponding to RGB) may have individual differences and may have changes due to the passage of time. The deviations of peak frequencies among these light sources affect the values obtained by reading the ACC pattern 21 (read values), and therefore it is desirable to correct the deviations of peak frequencies among the light sources.

Specifically, the controller 40 extracts a color component (a G component described below), by which the image data changes due to variations in the total spectral sensitivity characteristic of the reading device 1, from the read values of the ACC pattern 21 in which colors are not managed. The controller 40 corrects the extracted color component to a reference density. The controller 40 calculates the difference between a read value of the color component that has been corrected to the reference density, and the read value with respect to a reference of the total spectral sensitivity characteristic of the reading device 1. Then, the controller 40 estimates the variation in the total spectral sensitivity characteristic based on the calculated difference. According to this variation, the controller 40 corrects the scanner read value, and therefore it is possible to make color adjustments such that the variation in the total spectral sensitivity characteristic is reduced, even by using an ACC pattern in which colors are not managed.

<Configuration Example>

Figure 2:
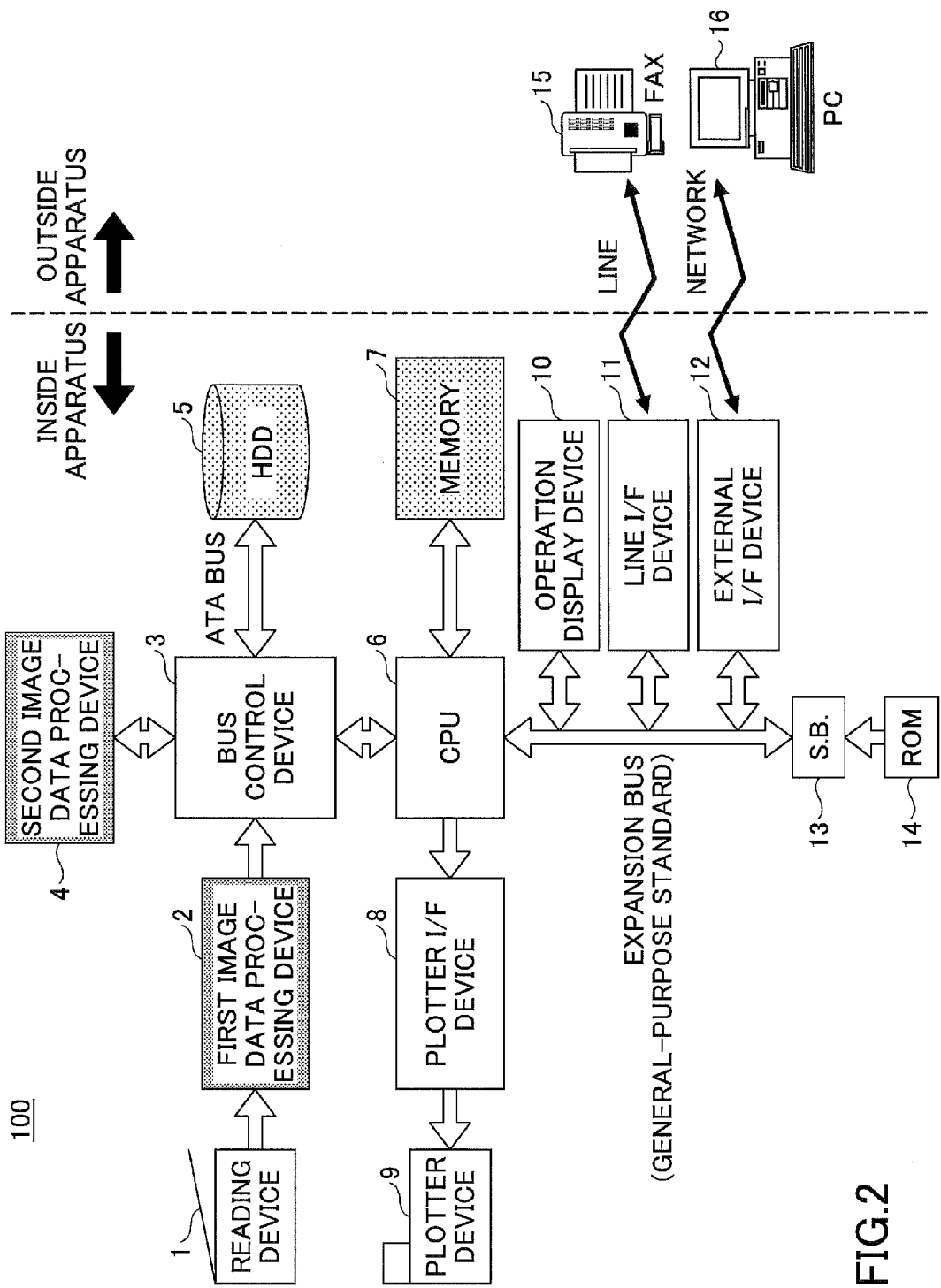
FIG. 2 is an example of an overall configuration diagram of an image processing apparatus realizing an image processing system according to an embodiment of the present invention.

FIG. 2 is an example of an overall configuration diagram of an image processing apparatus 100 realizing the image processing system illustrated in FIG. 1. The image processing apparatus 100 may also be referred to as a printer, a copier, a copying machine, an image forming apparatus, and a multifunction peripheral (MFP).

The reading device 1 includes a contact image sensor (CIS) including LED light sources of three colors (wavelengths corresponding to RGB) as illustrated in FIG. 1B and a photoelectric conversion element, an analog-to-digital (A/D) converter, and a driving circuit for driving these elements. The LED light sources of the three colors are sequentially lighted, and the reading device 1 reads a set original document in line sequence. Accordingly, the reading device 1 obtains shading information of the original document from this reading operation. Then, the reading device 1 generates RGB data including 8 bits of each of the RGB components, and outputs the RGB data.

The above method is advantageous compared to a charge coupled device (CCD) method that is another reading method. This is because the above method generally uses a small and thin device with low power consumption (there are model types that operate only be supplying power via a universal serial bus (USB) without using a power source cable), and that is low cost, and that does not require warm-up time and can thus start operating quickly.

However, the above method has been disadvantageous in terms of the reading speed and the color reproducibility reproduction characteristics. For example, when the original document is partially lifted up such as in a case where an open book is set by being turned downward, or when the original document has a rough surface, the images of portions of the original document that are away from the platen have tended to be defocused. However, these disadvantages have been improved in recent years by technical development, and the above method has been applied to many types of scanners.

However, the above method uses a LED light source having peak frequencies in a narrow band. Therefore, when there is a deviation in the peak wavelength of the light source, the read value of a color having a particular spectral reflectance will change, even by adjusting the grey balance of the RGB output by a white shading plate, etc. In the line sequence CIS scanner method, in which LED light sources having wavelengths corresponding to RGB of the present embodiment are sequentially lighted to read an original document, the deviations in the peak wavelengths of the light sources occur independently in the respective wavelengths corresponding to RGB as illustrated in FIG. 1B. Thus, compared to a white LED light source, the variations in the RGB data with respect to the original document tend to increase, and the chromaticity is difficult to manage.

The image processing apparatus 100 includes the reading device 1, a first image data processing device 2, a bus control device 3, a second image data processing device 4, a hard disk drive (HDD) 5, a central processing unit (CPU) 6, a memory 7, a plotter interface (I/F) device 8, the plotter device 9, an operation display device 10, a line I/F device 11, an external I/F device 12, a South Bridge (S. B.) 13, and a Read-only Memory (ROM) 14. Furthermore, a facsimile device 15 and a personal computer (PC) 16 are also illustrated together with the image processing apparatus 100.

The reading device 1 includes a line sensor formed of a CCD photoelectric conversion element, an A/D converter, and a driving circuit for driving these elements. The reading device 1 generates and outputs digital image data including 10 bits for each of R, G, and B, based on the shading information of an original document obtained by scanning a set original document.

The first image data processing device 2 performs a process on the digital image data generated by the reading device 1, to unify the characteristics of the digital image data with characteristics set in advance. By referring to FIG. 3, a description is given of the first image data processing device 2.

Figure 3:
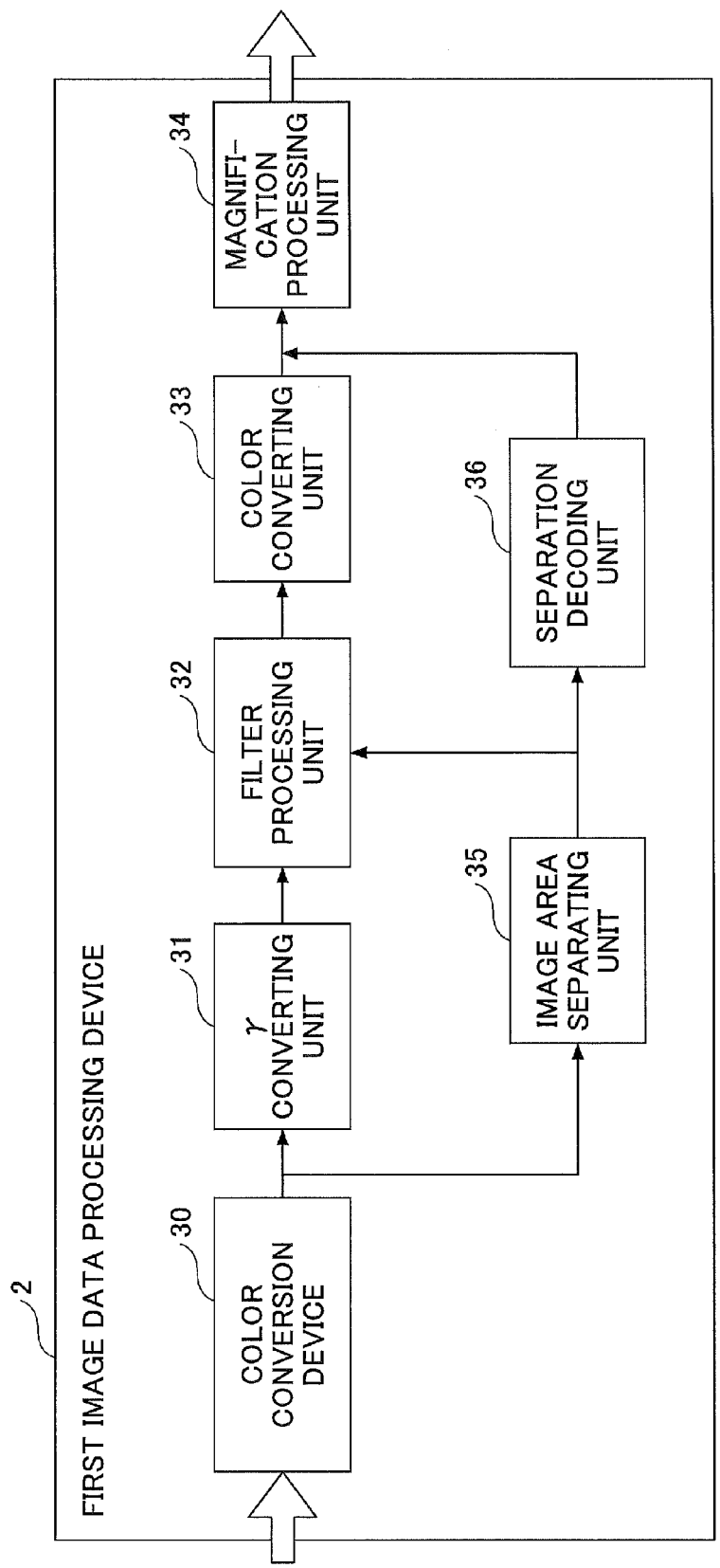
FIG. 3 is an example of a diagram for describing the functions of a first image data processing device according to an embodiment of the present invention.

FIG. 3 is an example of a diagram for describing the processes performed by the first image data processing device 2. The first image data processing device 2 makes corrections with respect to the digital image data from the reading device 1, to correct reading irregularities such as shading, etc., that are caused by the mechanism of the reading device 1 (such as illuminance distortion).

A filter processing unit 32 changes the frequency characteristic of the image that has been read to make the image sharp and smooth, in order to correct the modulation transfer function (MTF) characteristic of the scanner and to prevent moire.

A γ converting unit 31 basically performs γ conversion resulting from the scanner characteristics, and a color converting unit 33 performs color conversion resulting from the scanner characteristics. A magnification processing unit 34 performs a magnification process on the read image.

The image data, in which the color reproducibility has been unified, is accumulated in the image processing apparatus 100. When the image data is to be reused later, the image data is converted into image signals adapted to the characteristics of the output destination. Details are described below.

An image area separating unit 35 extracts characteristic areas of the original document. For example, the image area separating unit 35 extracts halftone dot parts formed by general printing operations, extracts edge parts such as characters, determines whether the image data is chromatic or achromatic, and determines whether the background image is a white background. A separation decoding unit 36 decodes image area separation signals from the image area separating unit 35 into an amount of information necessary for the process at the second image data processing device 4 of FIG. 2, and outputs the decoded signals.

Referring back to FIG. 2, the bus control device 3 is a device for controlling a data bus for exchanging various types of data such as image data and control commands needed in the image processing apparatus 100. The bus control device 3 also has a function of a bridge between a plurality of types of bus standards. In the present embodiment, the first image data processing device 2, the second image data processing device 4, and the CPU 6 are coupled by a Peripheral Component Interconnect (PCI)—Express bus, and these elements are coupled to the HDD 5 by an Advanced Technology Attachment (ATA) bus. The bus control device 3 is ASIC (application specific integrated circuit)-implemented.

The second image data processing device 4 performs image processing, which is adapted to the output destination specified by the user, on the image data in which the characteristics have been unified with characteristics set in advance by the first image data processing device 2 and auxiliary information (in the present embodiment, image area separation signals that have been decoded), and outputs the data. Details are described below.

The HDD 5 is a large capacity storage device for storing electronic data. In the image processing apparatus 100, the HDD 5 mainly stores digital image data and auxiliary information of the digital image data.

The CPU 6 is a microprocessor that manages the control of the entire image processing apparatus 100. In the present embodiment, an integrated CPU may be used, in which a +α function is added to the discrete CPU core. The memory 7 is a volatile memory that stores data that is temporarily exchanged in order to compensate for the difference in the speed when bridging a plurality of types of bus standards and the difference in the processing speed among the coupled components. Furthermore, when the CPU 6 controls the image processing apparatus 100, the memory 7 temporarily stores programs and intermediate processing data.

The CPU 6 is required to perform processes at high speed, and therefore the CPU 6 typically activates a system when the image processing apparatus 100 is activated by a boot program stored in the ROM 14. Subsequently, the CPU 6 performs processes by programs loaded in the memory 7 that can be accessed at high speed. In the present embodiment, a Dual Inline Memory Module (DIMM), which is also used in PCs, is used as the memory 7.

The plotter I/F device 8 performs a bus bridge process of receiving digital image data formed of the colors of CMYK sent from the CPU 6 and outputting the digital image data to an exclusive-use I/F of the plotter device 9. The general-purpose standard I/F used in the present embodiment is PCI-Express bus.

The plotter device 9 receives the digital image data formed of the colors of CMYK, and uses an electrophotographic process using laser beams to output the received image data on a transfer sheet.

The S. B. 13 is one of the chip sets used in a PC, and is a general-purpose electronic device referred to as a South Bridge. The S. B. 13 is formed by implementing a bus bridging function into a general-purpose circuit. The bus bridging function is often used when constructing a CPU system mainly including a PCI-Express and an Industry Standard Architecture (ISA) bridge. In the present embodiment, the S. B. 13 forms a bridge to the ROM 14.

The ROM 14 is a memory storing programs (including a boot program) used by the CPU 6 to control the image processing apparatus 100.

The operation display device 10 provides an interface between the image processing apparatus 100 and the user, and is formed of a liquid crystal display device (LCD) and key switches. The operation display device 10 displays various states of the image processing apparatus 100 and methods of operating the image processing apparatus 100 on the LCD, and detects input of a soft key or a key switch by the user. In the present embodiment, the operation display device 10 is coupled to the CPU 6 via the PCI-Express bus.

The line I/F device 11 is a device for coupling the PCI-Express bus with a telephone line. By the line I/F device 11, the image processing apparatus 100 can send and receive various types of data via the telephone line. The facsimile device 15 is a typical facsimile machine, and exchanges image data with the image processing apparatus 100 via the telephone line.

The external I/F device 12 is a device for coupling the PCI-Express bus with an external device. By the external I/F device 12, the image processing apparatus 100 can send and receive various types of data with an external device. In the present embodiment, a network (Ethernet (registered trademark)) is used as the interface. That is, the image processing apparatus 100 is coupled to the network via the external I/F device 12.

The PC 16 indicates a personal computer, and the user inputs and outputs various control operations and image data with respect to the image processing apparatus 100 via application software and drivers installed in the personal computer.

All of the information, including image data in which the characteristics are unified and the auxiliary information such as image area separation signals, sent from the first image data processing device 2 and the external I/F device 12, are encoded at the CPU 6 and then stored in the HDD 5. When devices from and beyond the second image data processing device 4 perform processes, the information is decoded and the decoded information is subjected to a conversion process. Here, the image data (RGB), in which the characteristics are unified, is processed at a high data compression ratio such as by lossy Joint Photographic Experts Group (JPEG) encoding. Conversely, the auxiliary information such as image area separation signals is processed by lossless K8 encoding, etc. Accordingly, the deterioration in the image quality is minimized.

<<Copy Operation>>

The user sets an original document in the reading device 1 and inputs settings such as the desired image quality mode and an instruction to start copying in the operation display device 10. The operation display device 10 converts the information input from the user into control command data inside the device, and issues the control command data. The issued control command data is reported to the CPU 6 via the PCI-Express bus.

The CPU 6 executes a program of a copy operation process according to the control command data indicating to start copying, and sequentially makes settings necessary for the copy operation and performs operations. In the following, the operation processes are sequentially described.

Digital image data including 10 bits of each of the RGB components is obtained by scanning an original document with the reading device 1. The first image data processing device 2 processes this digital image data by the units in FIG. 3 described above, regardless of the set image quality mode. Accordingly, in the digital image data, the characteristics are unified with RGB signals in which the characteristics are set in advance such as sRGB and ROMM-RGB, and the digital image data is sent to the bus control device 3.

Furthermore, the image area separating unit 35 of the first image data processing device 2 generates image area separation signals of 7 bits. The separation decoding unit 36 decodes these image area separation signals into information necessary for processes in the subsequent stage of the second image data processing device 4, according to the set image quality mode, and outputs the information. For example, the separation decoding unit 36 decodes the above image area separation signals of 7 bits output by the image area separating unit 35, into 2 bit attribute information (image area separation signals) as described below, according to the set image quality mode.

Character original document mode: black characters, white characters, within the character line width, non-characters Character photograph mixed original document mode: characters/non-characters, chromatic/achromatic Photograph original document mode: chromatic/achromatic, white background/non-white background Copy original document mode: black characters, color characters, white background, non-characters The bus control device 3 receives the unified RGB image data and the attribute information (image area separation signals) including different attributes according to the set image mode, from the first image data processing device 2. The received information is encoded by the CPU 6 and stored in the memory 7 or the HDD 5.

Next, the unified RGB image data and the attribute information of each pixel stored in the memory 7 or the HDD 5, are decoded at the CPU 6 and then sent to the second image data processing device 4 via the bus control device 3.

The second image data processing device 4 converts the received unified RGB image data into CMYK image data for plotter output based on the received attribute information of each pixel, and outputs the CMYK image data. The bus control device 3 receives the CMYK image data from the second image data processing device 4, and stores the CMYK image data in the memory 7 via the CPU 6.

Next, the CMYK image data, which has been stored in the memory 7, is sent to the plotter device 9 via the CPU 6 and the plotter I/F device 8.

The plotter device 9 outputs the received CMYK image data onto a transfer sheet, and a copy of the original document is generated.

Figure 4:
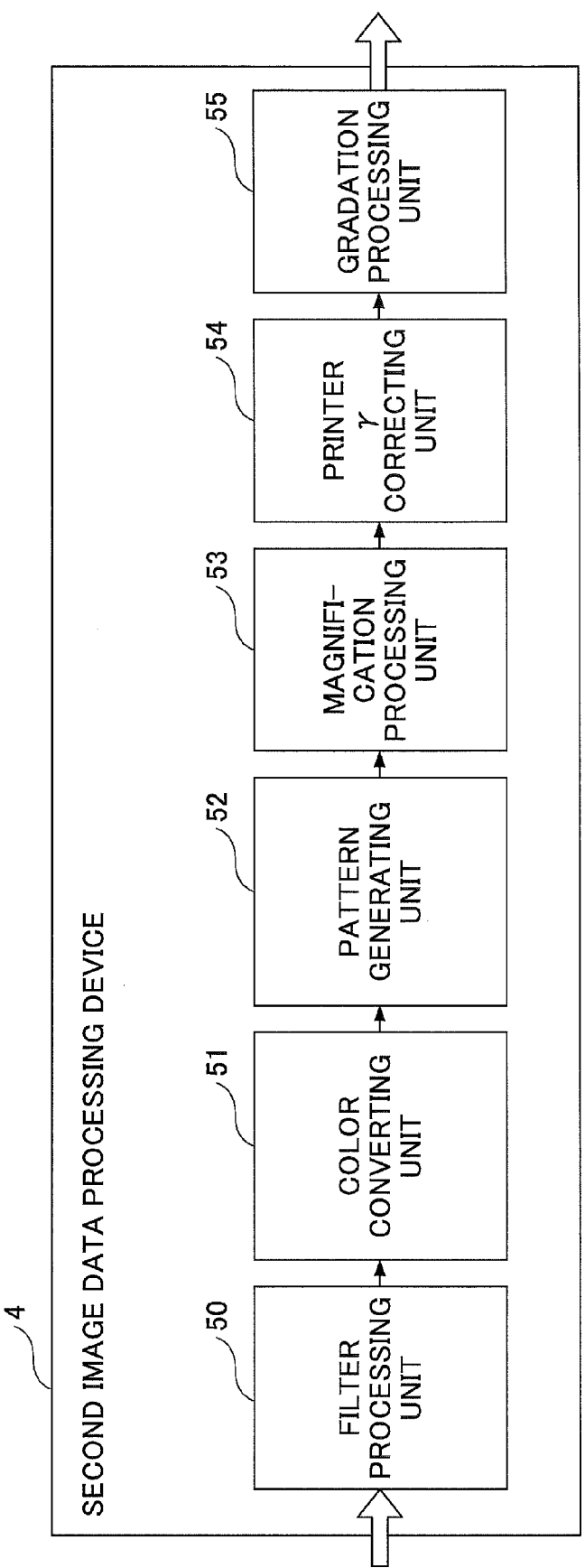
FIG. 4 is a diagram indicating the functions of a second image data processing device according to an embodiment of the present invention.

FIG. 4 is a diagram indicating the functions of the second image data processing device 4. The functions of the second image data processing device 4 differ according to the operations of copy, scanner distribution, print, and fax transmission, etc. Here, as one example, the functions in the case of a copy operation and fax transmission are described.

A filter processing unit 50 corrects the sharpness of the unified RGB image data, to improve the reproducibility when the image data is output to the plotter device 9. Specifically, the filter processing unit 50 performs a sharpening/smoothening process on the image data in line with attribute information (image area separation signals) decoded according to the set image quality mode. For example, in a character original document mode, a sharpening process is performed to make the characters appear to be precise and emphasized, and in a photograph mode, a smoothening process is performed to smoothly express the gradation.

A color converting unit 51 receives unified RGB data including 8 bits of each of the RGB components, and converts the RGB data into CMYK data including 8 bits of each of the CMYK components that is a color space for a plotter device. In this case also, the color converting unit 51 performs optimum color adjustment in line with the attribute information that has been decoded according to the set image quality mode information.

A magnification processing unit 53 performs size (resolution) conversion in line with the reproducibility performance of the plotter device 9, with respect to the size (resolution) of the CMYK image data. In the present embodiment, the output performance of the plotter device 9 is 600 dpi, and therefore the size is not particularly converted.

A printer γ correcting unit 54 performs γ correction by executing table conversion for the respective CMYK plates, by using a CMYK edge γ table and a CMYK non-edge γ table that have been generated in the CPU 6 in advance and set for plotter output.

A gradation processing unit 55 receives image data including 8 bits of each of the CMYK components, and performs a gradation number conversion process that is optimum for the attribute information that has been decoded in line with the gradation processing performance of the plotter device 9 and the image quality mode information that has been set.

Next, a description is given of the functions in a case of fax transmission. The filter processing unit 50 corrects the sharpness of the RGB image data, to improve the reproducibility at the time of fax transmission. Specifically, the filter processing unit 50 performs a sharpening/smoothening process on the image data in line with the desired mode information. For example, in a character mode, a sharpening process is performed to make the characters appear to be precise and emphasized, and in a photograph mode, a smoothening process is performed to smoothly express the gradation.

The color converting unit 51 receives RGB data including 8 bits of each of the RGB components, and converts the RGB data into monochrome 8 bit data generally used in a fax machine. The color converting unit 51 converts the size (resolution) of the monochrome image data into a size (resolution) to be sent and received by the fax machine. In the present embodiment, the size is converted into main scanning: 200 dpi×sub scanning: 100 dpi.

The printer γ correcting unit 54 performs γ correction by using a γ table for fax transmission set by the CPU 6 in advance.

The gradation processing unit 55 receives monochrome image data including 8 bits of a monochrome component, and performs a gradation number conversion process in line with the gradation processing performance when the fax machine sends and receives information. In the present embodiment, an error diffusion method, which is one of the pseudo medium tone processing methods, is used to perform the gradation number conversion process to convert the monochrome image data into binary data.

<Configuration of Color Converting Unit According to Present Embodiment>

Figure 5:
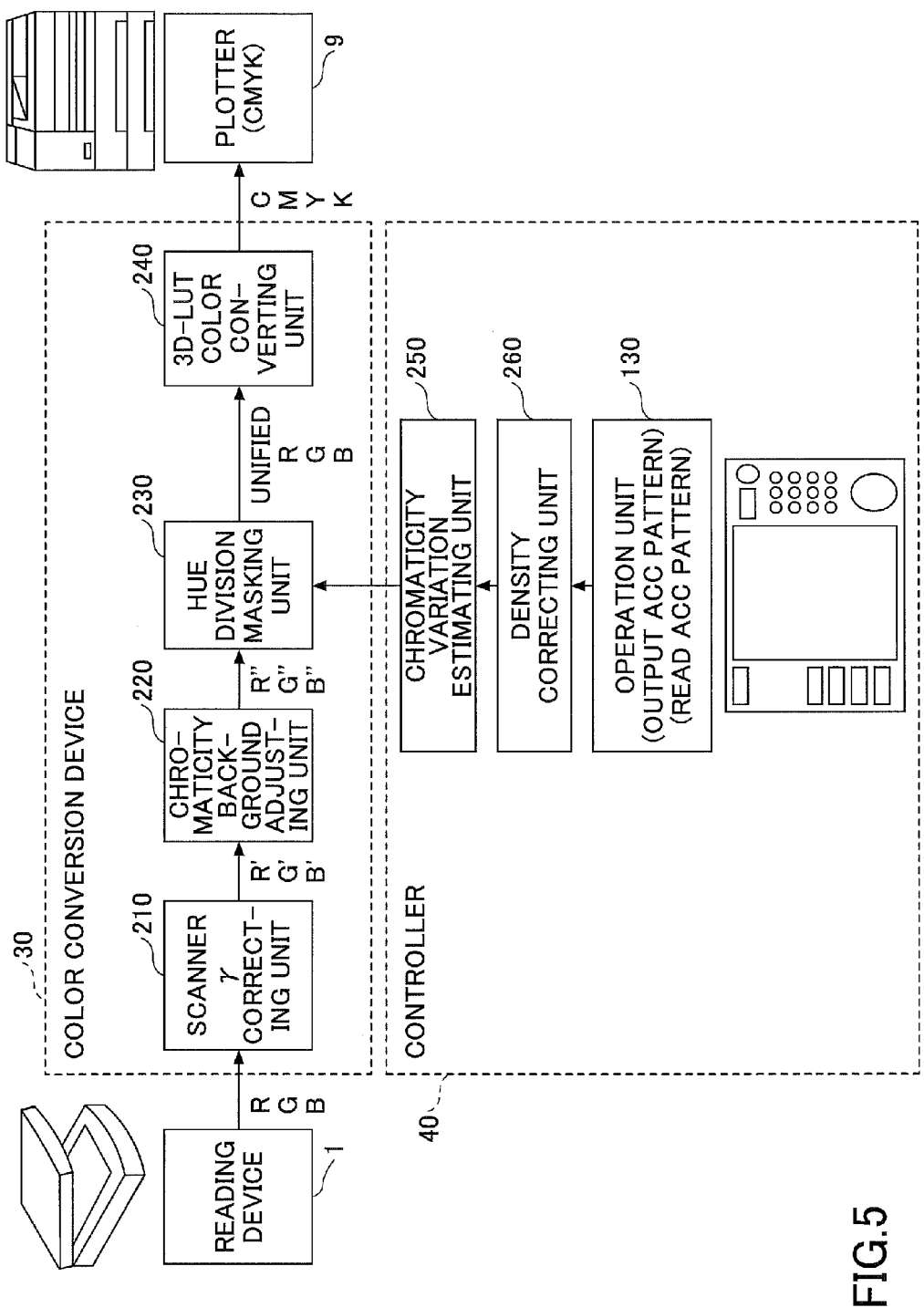
FIG. 5 is an example of a configuration diagram of a color conversion device according to an embodiment of the present invention.

FIG. 5 is an example of a configuration diagram of a color conversion device 30. Referring to FIG. 5, a description is given of a sequence of a color conversion flow with respect to image data, from scanner input to copy output, according to the present embodiment.

A scanner γ correcting unit 210 performs γ conversion on image data from the reading device 1, in order to unify the characteristics with characteristics set in advance. Specifically, the scanner γ correcting unit 210 uses a one-dimensional look-up table, etc., to perform γ conversion on the image data of the respective RGB components, for example, to obtain the 1/2.2 power. The scanner γ correcting unit 210 corresponds to the γ converting unit 31 of FIG. 3.

A chromaticity background adjusting unit 220 adjusts the colors before performing the color conversion into unified RGB. For example, the chromaticity background adjusting unit 220 converts the RGB image data into Yuv image data, and performs chromaticity adjustment by correcting uv signals and performs chromaticity background adjustment by correcting Y signals. The chromaticity background adjusting unit 220 corresponds to the γ converting unit 31 of FIG. 3.

A hue division masking unit 230 calculates the hue components with respect RGB data that has undergone the γ conversion, and performs linear transformation by using a masking coefficient set for each divided region for each hue, in order to unify the characteristics with characteristics set in advance. The hue division masking unit 230 corresponds to the color converting unit 33 of FIG. 3.

Figure 6:
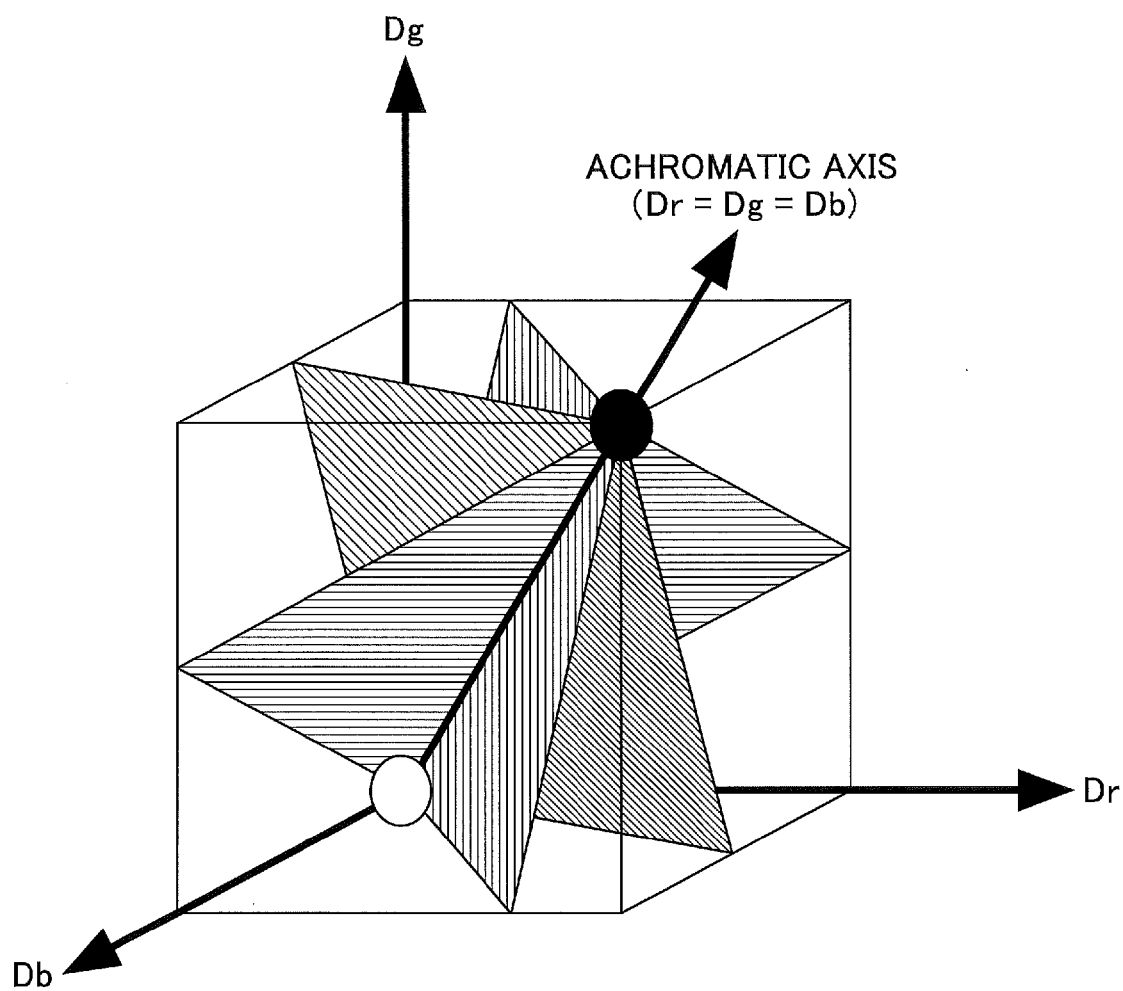
FIG. 6 is an example of a diagram for describing the division of the hue according to an embodiment of the present invention.

In the following, by referring to FIGS. 6 through 10, a description is given of the hue division masking unit 230. FIG. 6 is an example of a diagram for describing the division of the hue. In FIG. 6, the hue region is divided into 12 regions. The hue with respect to the RGB data is divided by dividing the entire three-dimensional RGB color space into planes extending radially from an achromatic color axis (Dr=Dg=Db) at the center, as illustrated in FIG. 6. Specifically, the hue determination is realized by converting image signals (snpr, snpg, snpb) into hue signals (HUE), comparing the hue signals with hue boundary values (HUE00 through HUE11), determining the hue region to be any one of the 12 regions based on the comparison result, and outputting hue region signals (Huejo).

<<Generation of Color Difference Signals>>

The hue division masking unit 230 generates color difference signals (X, Y) from the difference (for example, G component-R component and B component-G component) between the image signals (snpr, snpg, snpb).

<<Detection of Wide Area Hue>>

The hue division masking unit 230 generates wide area hue signals (HUEH) from the color difference signals (X, Y). The wide area hue signals (HUEH) indicate regions obtained by dividing the X-Y signal plane into 8 regions.

Figure 7:
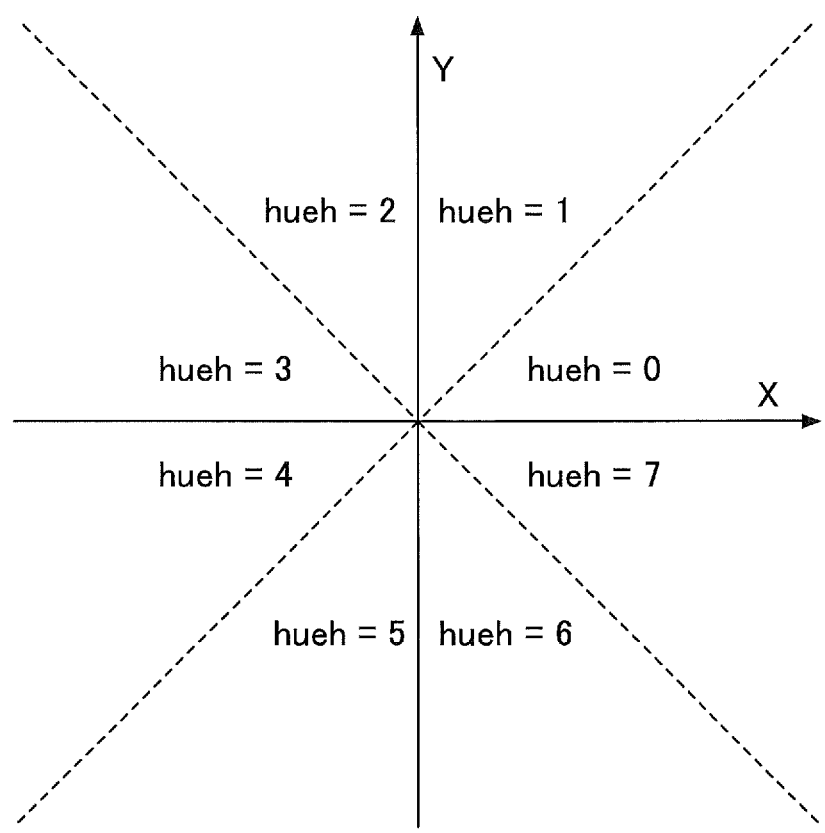
FIG. 7 is an example of a diagram for describing the wide area hue signals (HUEH) according to an embodiment of the present invention.

FIG. 7 is an example of a diagram for describing the wide area hue signals (HUEH). As illustrated in FIG. 7, the wide area hue signal (HUEH) has any one of the values of HUEH=0 through 8 depending on the region in the X-Y signal plane to which the color difference signal (X, Y) belongs.

<<Rotation of Color Difference Signal>>

The hue division masking unit 230 generates color difference signals (XA, YA) according to the wide area hue signals (HUEH). The color difference signals (XA, YA) correspond to coordinates obtained by rotating the color difference signal plane (X, Y) centering around the origin and moving the regions of HUEH=1 through 8 to the region "HUEH=0".

<<Detection of Narrow Area Hue>>

The hue division masking unit 230 generates narrow area hue signals (HUEL) from the color difference signals (XA, YA). The narrow area hue signals (HUEL) indicate the tilt of the color difference signal plane coordinates. Therefore, narrow area hue signals (HUEL)=YA/XA.

<<Hue Boundary Register>>

The hue division masking unit 230 outputs hue boundary signal register setting values corresponding to the hue boundary signals (HUE00 through HUE11). The hue boundary signal register setting values (HUE00 through HUE11) correspond to the 12 regions in FIG. 6.

<<Hue Region Determination>>

The hue division masking unit 230 compares the values of the hue boundary signals (HUE00 through HUE11: 8 bits) with the values of the hue signals (HUEHL{wide area hue signal HUEH, narrow area hue signal HUEL}), and generates a hue region (HUE). That is, the hue division masking unit 230 determines one of the 12 regions of FIG. 6 as the region to which the hue corresponds.

<<Hue Division Masking>>

The hue division masking unit 230 performs a masking operation according to the hue, based on the hue signal HUE obtained by the hue region determination. In the present embodiment, a masking operation is performed to convert scanner RGB into unified RGB.

Here, in a case of performing a product-sum operation in linear masking in 12 hue division, the processes are separately performed for the respective colors of RGB. Linear masking is a method of color reproduction that has been used for a long time in the field of printing. This is a method of creating the respective output YMC plates by adjusting and superposing the densities of the respective input RGB plates, in order to remove needless absorption of color materials. In the case of a digital process, this method corresponds to a method in which matrix calculation (performing a product-sum operation) of 3×3 is performed with respect to RGB to obtain YMC.

The hue division masking unit 230 selects and calculates a color correction coefficient and a color correction constant for linear masking, based on the hue signal HUE calculated according to the hue region determination. The method of obtaining the color correction coefficient and the color correction constant is described below. In the following, the linear masking according to the present embodiment is referred to as hue division masking or 12 hue division masking.

<<Hue Division Masking>>

The hue division masking unit 230 performs a linear masking operation according to the hue, based on the hue signal HUE obtained by the hue region determination. In the present embodiment, a masking operation is performed to convert scanner RGB into unified RGB.

Here, in a case of performing a product-sum operation in linear masking in 12 hue division, the processes are separately performed for the respective colors of RGB. The hue division masking unit 230 selects and calculates a color correction coefficient and a color correction constant, based on the hue signal HUE calculated according to the hue region determination.

Furthermore, the masking coefficient of each hue can be determined, if the correspondence relationship (Dr, Dg, Db)<=>(Dc, Dm, Dy, Dk) between the two points along the achromatic axis and the two points on both boundary planes (a total of four points) is known. Here, the input colors are defined as RGB (scanner vector) and the output colors (corresponding colors) are defined as CMYK (printer vector). However, the attributes of the input output data can be set to any attributes. It is possible to perform general-purpose color conversion, including a linear masking operation of converting the scanner RGB to the unified RGB.

Furthermore, the printer vector (corresponding colors) with respect to the scanner vector (input colors) may be switched according to the mode, or changed according to color correction (color adjustment and color processing) before obtaining the masking coefficient, to efficiently respond to various kinds of color correction.

Figure 8:
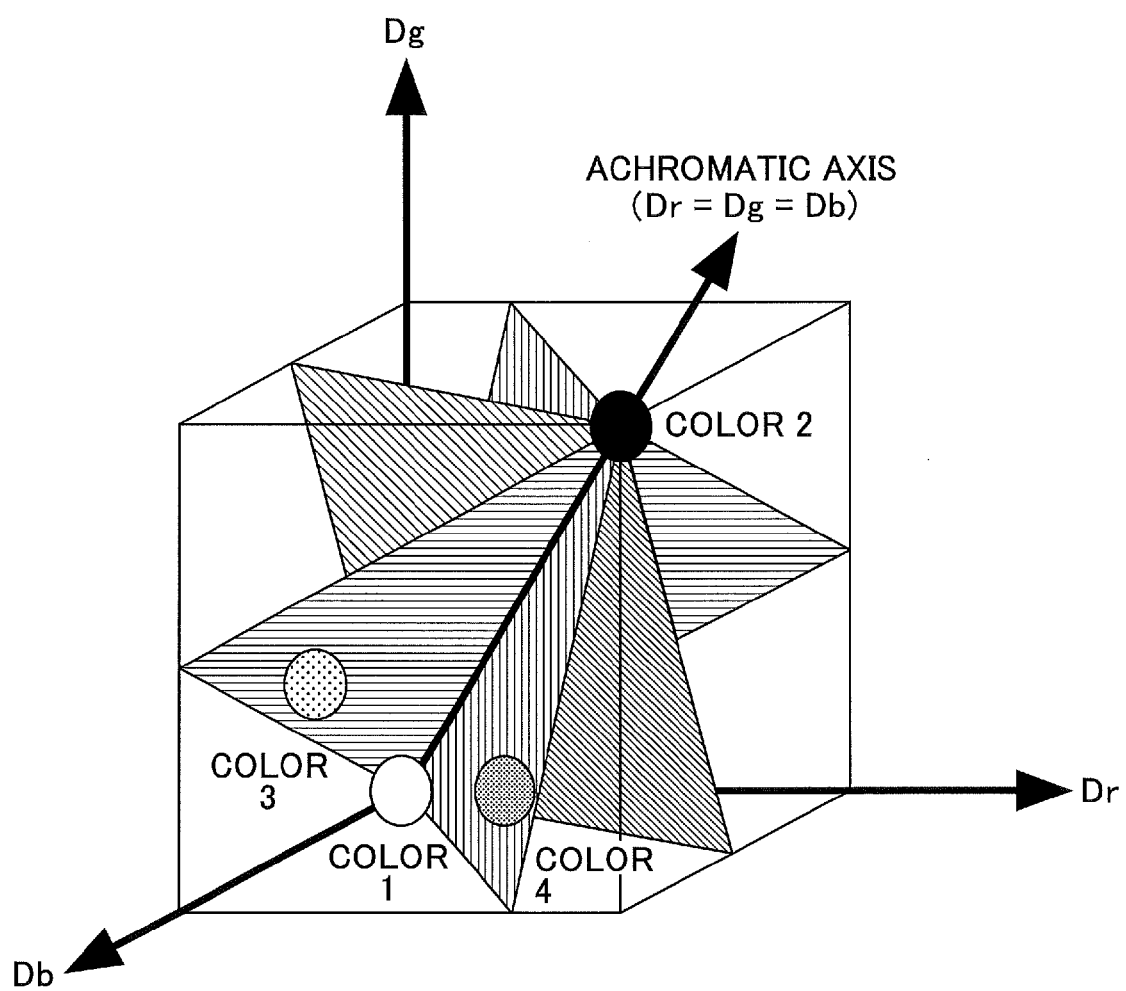
FIG. 8 is a diagram of an example for describing the method of calculating a masking coefficient according to an embodiment of the present invention.

FIG. 8 is a diagram of an example for describing the method of calculating a masking coefficient. In FIG. 8, the correspondence relationship between the two points along an achromatic axis and the two points on both boundary planes are indicated by color 1 through color 4. The correspondence relationship of (Dr, Dg, Db)<=>(Dc, Dm, Dy, Dk) is expressed by formula (1).

[Formula (1)]

$$\begin{pmatrix} D1c \\ D1m \\ D1y \\ D1k \end{pmatrix} \Leftrightarrow \begin{pmatrix} D1r \\ D1g \\ D1b \\ 1024 \end{pmatrix} \begin{pmatrix} D2c \\ D2m \\ D2y \\ D2k \end{pmatrix} \Leftrightarrow \begin{pmatrix} D2r \\ D2g \\ D2b \\ 1024 \end{pmatrix} \quad (1)$$

$$\begin{pmatrix} D3c \\ D3m \\ D3y \\ D3k \end{pmatrix} \Leftrightarrow \begin{pmatrix} D3r \\ D3g \\ D3b \\ 1024 \end{pmatrix} \begin{pmatrix} D4c \\ D4m \\ D4y \\ D4k \end{pmatrix} \Leftrightarrow \begin{pmatrix} D4r \\ D4g \\ D4b \\ 1024 \end{pmatrix}$$

The masking coefficient, which connects the correspondence relationships of matrices obtained by integrating these matrices, can be calculated by the hue division masking unit 230. Specifically, the hue division masking unit 230 obtains the product of an inverse matrix of a matrix obtained by integrating the right sides in color 1 through color 4 and a matrix obtained by integrating the left sides in color 1 through color 4, to obtain the masking coefficient. As described above, when the relationship between the two points along the achromatic axis (black and white) and the two points on both boundary planes (a total of four points) is determined, the masking coefficient can be obtained. Therefore, regardless of the attributes of the input output data, as the parameter design of color conversion, the right side of formula (1) is defined as the scanner vector and the left side of formula (1) is defined as the printer vector, and the scanner vector and the printer vector of the respective division points are obtained.

<<Color Conversion By Hue Division Masking>>

In color conversion by hue division masking, division is performed with respect to two points each at the respective division points in the color space of a primary color (C, M, Y) and a secondary color (R, G, B), at a total of 12 points.

Figure 9:
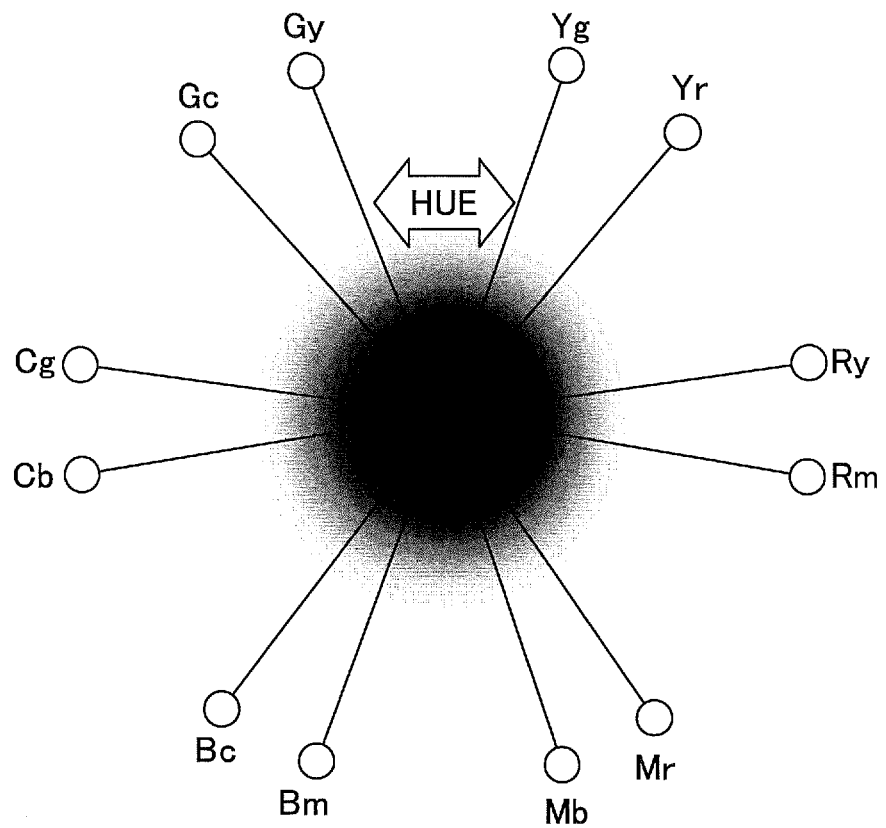
FIG. 9 is an example of a diagram for describing hue division according to an embodiment of the present invention.

FIG. 9 is an example of a diagram for describing hue division. After setting the final scanner vectors and the printer vectors of 14 points including the white point and the black point along the achromatic axis as illustrated in FIG. 9, it is possible to calculate a masking coefficient for each hue region.

FIG. 10 is an example of a diagram for describing parameters used in the scanner color conversion. FIG. 10 indicates the scanner vectors and the printer vectors of 14 points, including the 12 points of chromatic colors and 2 points of black and white illustrated FIG. 9.

Note that the calibration by the reading device 1 according to the present embodiment is realized by correcting the scanner vectors before calculating the masking coefficient of hue division described above.

<<3D-LUT Color Conversion, Operation Unit>>

Referring back to FIG. 5, in the case of a copy operation, a three-dimensional look-up table (3D-LUT) color converting unit 240 converts the unified RGB image data into CMYK image data for plotter control, at the second image data processing device 4 of FIG. 2. The 3D-LUT color converting unit 240 corresponds to the color converting unit 51 of FIG. 4.

In the case of a copy (plotter) output operation, the 3D-LUT color converting unit 240 performs three-dimensional LUT conversion to convert the image data into output colors (CMYK) of the plotter device 9. As the conversion algorithm by three-dimensional conversion, a memory map interpolation method, which is widely used in the related art, is used. Three-dimensional conversion interpolation is performed with respect to the input unified RGB image data to perform the color conversion.

An operation unit 130 of FIG. 5 corresponds to an interface part in the controller 40 of FIG. 5, and provides an interface between the image processing apparatus 100 and the user. The operation unit 130 includes a liquid-crystal display device (LCD) and key switches, and displays various states of the image processing apparatus 100 and operation methods of the image processing apparatus 100 on the LCD, and detects key switch inputs from the user. In the present embodiment, image input output conditions and image processing conditions relevant to the selection of an image input output device, the original document type, and the preferred finish (density settings, etc.) in a copy operation etc., are set, and additionally, operation conditions, etc., of a calibration operation are set.

<calibration of Reading Device>

Next, a description is given of calibration (scanner chromaticity correction) performed with the use of a scanner read value obtained by the reading device 1 by reading the ACC pattern 21 that is actually formed on a recording sheet. This function is for correcting the chromaticity variation of the total spectral sensitivity characteristic of the reading device 1, by using the CMYK gradation pattern (ACC pattern 21) for each color used in the image forming process that is formed on a recording sheet to adjust the output γ conversion characteristic. By reading the CMYK gradation pattern (ACC pattern 21) with the reading device 1 and adjusting the output γ conversion characteristic, even when there are variations in the image output density of the image processing apparatus due to usage over a long period of time, it is possible to correct the density to a target output density, and the color reproducibility of the output image can be maintained.

Figure 11:
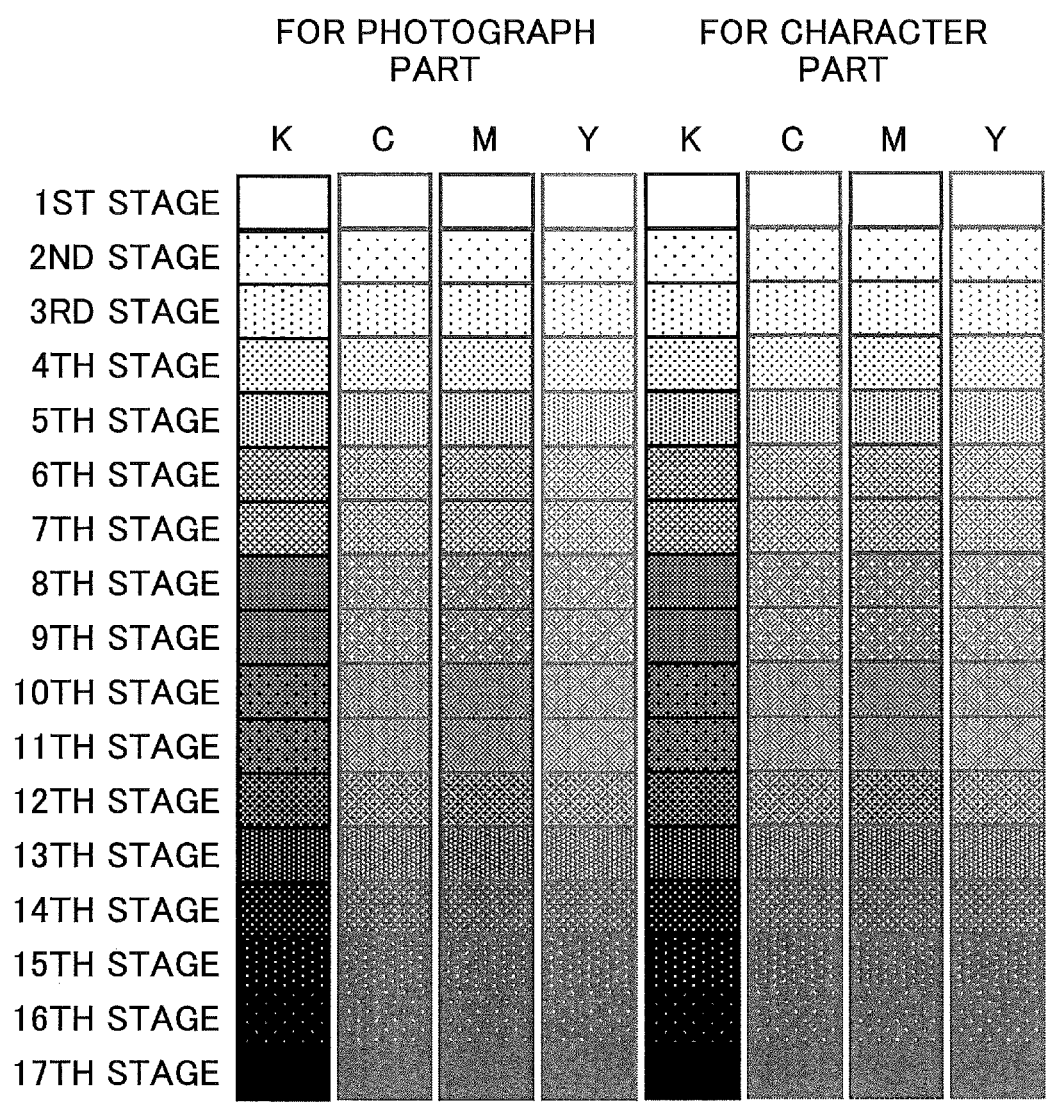
FIG. 11 illustrates an example of CMYK image data used in calibration according to an embodiment of the present invention.

In the case of a calibration operation by using the scanner read value obtained by reading the CMYK gradation pattern (ACC pattern 21) according to the present embodiment, in a pattern generating unit 52 in the first image data processing device 2 of FIG. 4, the internal patterns illustrated in FIG. 11 stored in the controller 40 for controlling the entire image processing apparatus, are expanded in the frame memory as CMYK image data in a bitmap form.

FIG. 11 illustrates an example of CMYK image data (ACC pattern 21) used in calibration. The plotter device 9 of FIG. 2 outputs an image corresponding to a read pattern for calibration on a recording sheet, based on this CMYK image data. Here, the filter processing unit 50, the color converting unit 51, and the printer γ correcting unit 54 of the second image data processing device 4 of FIG. 4 do not particularly perform conversion.

The reading device 1 outputs digital image data of RGB, based on the shading information of an original image obtained by scanning the above original document that has been set. The reading device 1 is provided with a CIS including LED light sources of three colors (wavelengths corresponding to RGB) indicated in FIG. 1B and a photoelectric conversion element, an A/D converter, and a driving circuit for driving these elements. The LED light sources of the three colors are sequentially lighted, and the reading device 1 reads a set original document in line sequence.

Accordingly, the reading device 1 obtains shading information of the original document from this reading operation. Then, the reading device 1 generates RGB data including 8 bits of each of the RGB components based on the obtained shading information, and outputs the RGB data.

At this time, the first image data processing device 2 of FIG. 3 makes corrections with respect to the digital image data, to correct shading and reading irregularities, etc., that are caused by the mechanism of the reading device 1 (such as illuminance distortion). The magnification processing unit 34 converts the size (resolution) of the CMYK image data in line with the reproduction performance of the plotter device. In the present embodiment, the magnification processing unit 34 does not particularly perform conversion.

The controller 40 that controls the entire image processing apparatus acquires a read value (average value of the RGB values in the reading region) that is output with respect to the RGB image data (scanner read value) corresponding to the ACC pattern 21 illustrated in FIG. 11 as described above. The ACC read values of RGB obtained in this way are illustrated in FIG. 12.

Figure 12:
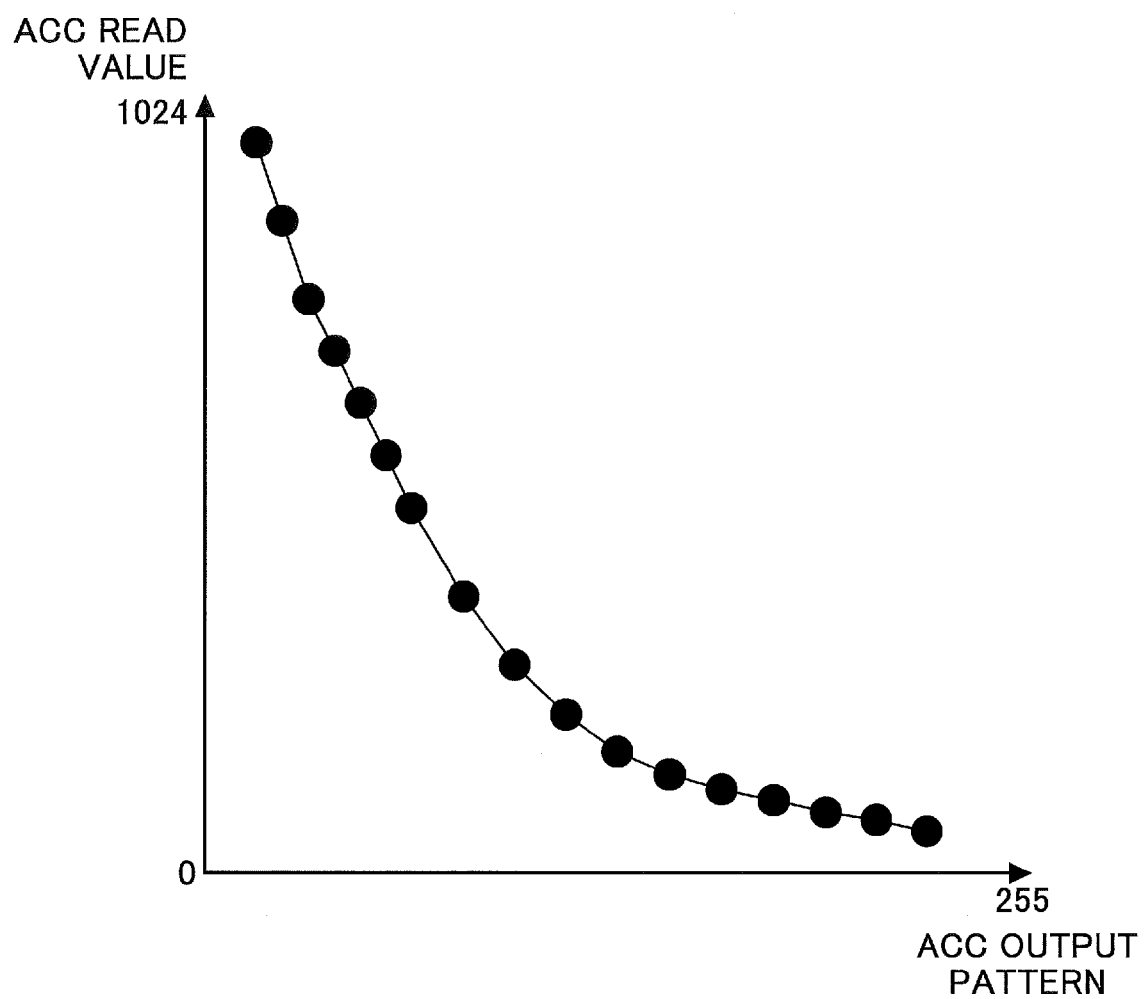
FIG. 12 is an example of a graph for describing the correspondence relationship between the ACC read values and the ACC pattern according to an embodiment of the present invention.

FIG. 12 is an example of a graph for describing the correspondence relationship between the ACC read values and the ACC output pattern. The ACC output pattern is indicative of values written into the plotter engine. According to FIG. 12, ACC read values (corresponding to plotter Raw γ output density) with respect to the ACC output pattern are obtained.

The setting of FIG. 12 is made for each of the CMYK components of process colors used in calibration, and the obtained results are stored as Raw γ characteristics of the plotter. The present embodiment uses a plate in which the γ target data for scanner chromaticity correction set in advance as indicated below, is not zero. Furthermore, in the present embodiment, a description is given of calibration (scanner chromaticity correction) using the ACC pattern 21 for photograph reproduction (region).

<Acquisition of Scanner Chromaticity Correction γ Target>

A density correcting unit 260 acquires a γ target (read value of main component) that is referred to at the time of scanner chromaticity correction according to the reading conditions. The example of the following parameter settings is of a case where a process is performed only on the ACC pattern 21 of cyan extracted for detecting the difference in the CIS scanner total spectral sensitivity characteristic of the correction target. That is, the ACC pattern 21 of cyan is extracted. The reason why cyan is extracted is because cyan has a flat region with respect to the wavelength of the light source as described below.

[Example of γ Target Data for Scanner Chromaticity Correction ACC]

<TABLE>γ target (for reading by CIS)
<RGB_K>0,
<RGB_C>80,
<RGB_M>0,
<RGB_Y>0,

<Calculation of γ Correction Value for Scanner Chromaticity Correction>

The controller 40 obtains a γ correction value for scanner chromaticity correction with respect to the Raw γ characteristic calculated as above and the γ target data for scanner chromaticity correction ACC. The controller 40 acquires the γ target (corresponding to target density) set by the scanner RGB read values as follows, for each of the CMYK components corresponding to the recording sheet set by the operator.

This input output characteristic data corresponds to the output density of the plotter (converted into read value of scanner) with respect to input of CMYK data (8 bits for each color) handled by a gradation processing unit 55 illustrated in FIG. 4. The γ correction value for scanner chromaticity correction is obtained by the same process as the operation of calculating a γ correction from the ACC target value (density) in the calibration for a printer.

When calculating the γ correction value for scanner chromaticity correction, the ACC read values corresponding to the respective ACC target colors are as follows.

ACC target color: Black
    ACC reading color component: Green
ACC target color: Cyan
    ACC reading color component: Red
ACC target color: Magenta
    ACC reading color component: Green
ACC target color: Yellow
    ACC reading color component: Blue The above process is performed for each CMYK data item (reference value and present value) of the plate in which the γ correction data for scanner chromaticity correction is not zero. The controller 40 stores the obtained values as a γ correction value for scanner chromaticity correction (reference value) and a γ correction value for scanner chromaticity correction (present value). The present value is data relevant to a scanner reading operation of the color correction target, and the reference value is data relevant to a scanner reading operation in which the total spectral sensitivity characteristic is TYPICAL.

<Calculation of Scanner Vector Correction Value>

Based on the γ correction value for scanner chromaticity correction (reference value) and the γ correction value for scanner chromaticity correction (present value), a scanner vector correction value for scanner chromaticity correction is calculated as follows.

[Data to Be Used]
    γ correction value for scanner chromaticity correction (reference value) and γ correction value for scanner chromaticity correction (present value) (C, M, Y, K)
    Laser Diode (LD) data for scanner chromaticity correction (C, M, Y, K)
    Scanner vector correction value (correction table) (C_R, C_G, C_B, M_R, M_G, M_B, Y_R, Y_G, Y_B, K_R, K_G, K_B)

The controller 40 calculates the difference between the γ correction value for scanner chromaticity correction (reference value) and the γ correction value for scanner chromaticity correction (present value), as a Laser Diode (LD) reference value. This LD reference value indicates the difference (that is, the difference in the total spectral sensitivity characteristic) between a read value (RGB) obtained by reading a monochrome color (for example, a cyan plate) having a density defined in advance by the reading device having a total spectral sensitivity characteristic that is the reference, and a scanner read value (RGB) obtained by reading a monochrome color (a cyan plate) having the same density with a scanner that is a correction target.

LD reference value=γ correction value for scanner chromaticity correction (present value)−γ correction value for scanner chromaticity correction (reference value)

Then, the controller 40 compares the LD reference value with the values set in each of the Laser Diodes (LDs) (0 through 10) indicated below, to calculate scanner vector correction input values. Note that with respect to color components for which there is no correlation between the difference with the scanner read value and the total spectral sensitivity characteristic of the scanner (zero is set in the present embodiment), the following correction process is not performed.

[Example of Scanner Chromaticity Correction Laser Diode (LD) Data (Parameter) Setting]

<LD_C> scanner chromaticity correction Laser Diode (LD) data (for C input)

|       | (LD0 | LD1 | LD2 | LD3 | LD4 | LD5 | LD6 | LD7 | LD8 | LD9 | LD10) |
|-------|------|-----|-----|-----|-----|-----|-----|-----|-----|-----|-------|
| <C_R> | 0,   | 0,  | 0,  | 0,  | 0,  | 0,  | 0,  | 0,  | 0,  | 0,  | 0,    |
| <C_G> | −30, | −20,| −15,| −10,| −5, | 0,  | 2,  | 4,  | 6,  | 8,  | 10,   |
| <C_B> | 0,   | 0,  | 0,  | 0,  | 0,  | 0,  | 0,  | 0,  | 0,  | 0,  | 0,    |

The above parameter setting example indicates a case of extracting the difference of the G component obtained by the scanner reading operation of cyan having an image density set in advance, as the difference of the scanner total spectral sensitivity characteristic (G component), to correct the color correction parameter with respect to the color region that is affected.

Note that with respect to the scanner chromaticity correction Laser Diode (LD) data, the following parameters are set according to the scanner reading condition (CCD and CIS, etc.) of the scanner that is the target of scanner correction.

LD0≤LD1≤LD2≤LD3≤LD4≤LD5≤LD7≤LD8≤LD9≤LD10

For the LD 5, a Laser Diode (LD) value (a read value of a monochrome pattern having a density that is defined in advance) corresponding to a scanner characteristic (TYPICAL) is set, and for the LD 0 and the LD 10, LD values (read values of a monochrome pattern having a density that is defined in advance), which are obtained from the scanner characteristics in which the variations in the total spectral sensitivity characteristic is the upper limit and the lower limit, are set.

The controller 40 searches the scanner vector parameter table based on the magnitude relation between the LD (0 through 10) setting values and the LD reference value calculated as described above, and calculates a scanner vector correction value for each hue (for each color component).

[Example of Scanner Vector Correction Parameter (Table) Setting]

TABLE 1

| SCANNER VECTOR (HUE) | | SCANNER CHROMATICITY CORRECTION LD | | | | | | | | | | |
|---|---|---|---|---|---|---|---|---|---|---|---|---|
| | | LD0 | LD1 | LD2 | LD3 | LD4 | LD5 | LD6 | LD7 | LD8 | LD9 | LD10 |
| Rm | Rmr | 0 | 0 | 0 | 0 | 0 | 0 | 0 | 0 | 0 | 0 | 0 |
| | Rmg | 7 | 6 | 5 | 4 | 2 | 0 | −3 | −6 | −9 | −12 | −12 |
| | Rmb | 0 | 0 | 0 | 0 | 0 | 0 | 0 | 0 | 0 | 0 | 0 |
| Ry | Ryr | 0 | 0 | 0 | 0 | 0 | 0 | 0 | 0 | 0 | 0 | 0 |
| | Ryg | 8 | 6 | 4 | 2 | 1 | 0 | −1 | −3 | −5 | −7 | −9 |
| | Ryb | 0 | 0 | 0 | 0 | 0 | 0 | 0 | 0 | 0 | 0 | 0 |
| Yr | Yrr | 0 | 0 | 0 | 0 | 0 | 0 | 0 | 0 | 0 | 0 | 0 |
| | Yrg | 0 | 0 | 0 | 0 | 0 | 0 | 0 | 0 | 0 | 0 | 0 |
| | Yrb | 0 | 0 | 0 | 0 | 0 | 0 | 0 | 0 | 0 | 0 | 0 |
| Yg | Ygr | 0 | 0 | 0 | 0 | 0 | 0 | 0 | 0 | 0 | 0 | 0 |
| | Ygg | 0 | 0 | 0 | 0 | 0 | 0 | 0 | 0 | 0 | 0 | 0 |
| | Ygb | 0 | 0 | 0 | 0 | 0 | 0 | 0 | 0 | 0 | 0 | 0 |
| Gy | Gyr | 0 | 0 | 0 | 0 | 0 | 0 | 0 | 0 | 0 | 0 | 0 |
| | Gyg | 0 | 0 | 0 | 0 | 0 | 0 | 0 | 0 | 0 | 0 | 0 |
| | Gyb | 0 | 0 | 0 | 0 | 0 | 0 | 0 | 0 | 0 | 0 | 0 |
| Gc | Gcr | 0 | 0 | 0 | 0 | 0 | 0 | 0 | 0 | 0 | 0 | 0 |
| | Gcg | 0 | 0 | 0 | 0 | 0 | 0 | 0 | 0 | 0 | 0 | 0 |
| | Gcb | 0 | 0 | 0 | 0 | 0 | 0 | 0 | 0 | 0 | 0 | 0 |
| Cg | Cgr | 0 | 0 | 0 | 0 | 0 | 0 | 0 | 0 | 0 | 0 | 0 |
| | Cgg | −18 | −15 | −12 | −9 | −4 | 0 | 3 | 6 | 9 | 12 | 12 |
| | Cgb | 0 | 0 | 0 | 0 | 0 | 0 | 0 | 0 | 0 | 0 | 0 |
| Cb | Cbr | 0 | 0 | 0 | 0 | 0 | 0 | 0 | 0 | 0 | 0 | 0 |
| | Cbg | −20 | −20 | −15 | −10 | −5 | 0 | 4 | 8 | 12 | 16 | 20 |
| | Cbb | 0 | 0 | 0 | 0 | 0 | 0 | 0 | 0 | 0 | 0 | 0 |
| Bc | Bcr | 0 | 0 | 0 | 0 | 0 | 0 | 0 | 0 | 0 | 0 | 0 |
| | Bcg | −18 | −15 | −12 | −9 | −4 | 0 | 3 | 6 | 9 | 12 | 12 |
| | Bcb | 0 | 0 | 0 | 0 | 0 | 0 | 0 | 0 | 0 | 0 | 0 |
| Bm | Bmr | 0 | 0 | 0 | 0 | 0 | 0 | 0 | 0 | 0 | 0 | 0 |
| | Bmg | −20 | −20 | −15 | −10 | −5 | 0 | 4 | 8 | 12 | 16 | 20 |
| | Bmb | 0 | 0 | 0 | 0 | 0 | 0 | 0 | 0 | 0 | 0 | 0 |
| Mb | Mbr | 0 | 0 | 0 | 0 | 0 | 0 | 0 | 0 | 0 | 0 | 0 |
| | Mbg | 0 | 0 | 0 | 0 | 0 | 0 | 0 | 0 | 0 | 0 | 0 |
| | Mbb | 0 | 0 | 0 | 0 | 0 | 0 | 0 | 0 | 0 | 0 | 0 |
| Mr | Mrr | 8 | 6 | 4 | 2 | 1 | 0 | −1 | −3 | −5 | −7 | −9 |
| | Mrg | 7 | 6 | 5 | 4 | 2 | 0 | −3 | −6 | −9 | −12 | −12 |
| | Mrb | 0 | 0 | 0 | 0 | 0 | 0 | 0 | 0 | 0 | 0 | 0 |

Table 1 indicates an example of a scanner chromaticity correction parameter setting of calibration by reading the ACC pattern 21. In table 1, the correction values of the respective scanner vectors are registered with respect to LD 0 through 1. LD 5 indicates the reference (TYPICAL) LD data; however, the reference may be set at any LD.

Figure 13:
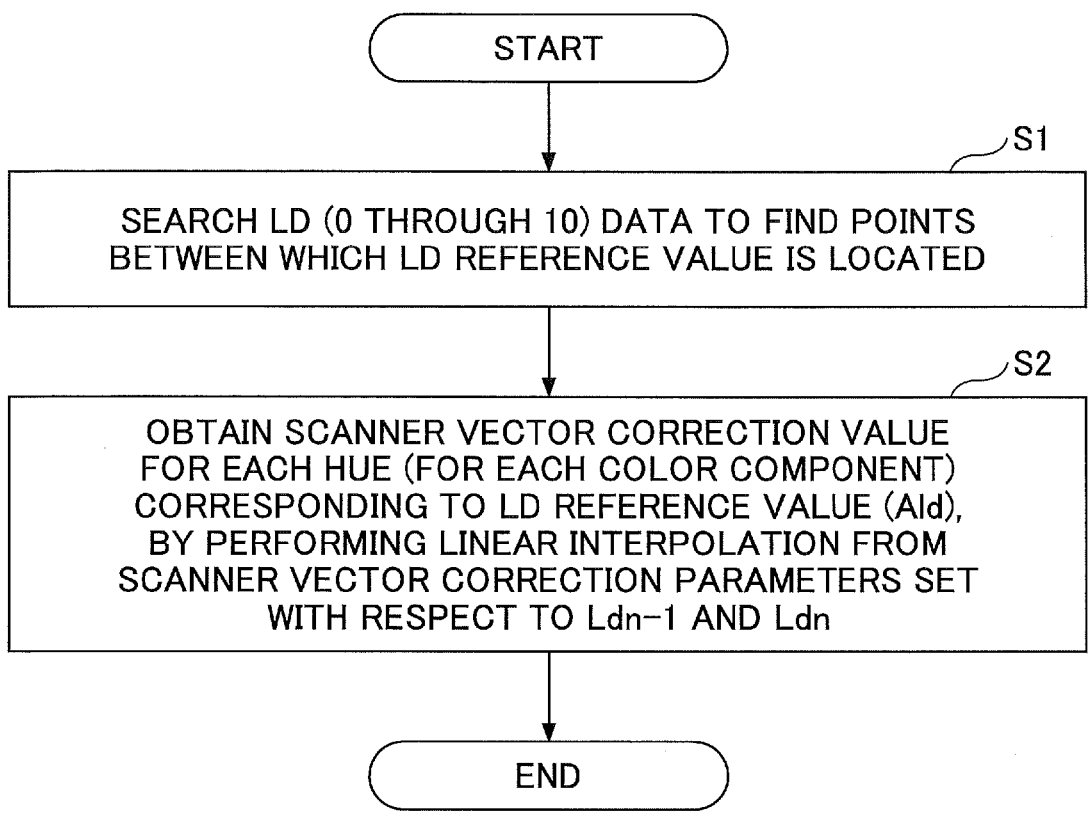
FIG. 13 is an example of a flowchart indicating the procedures of calculating the scanner vector correction value by a density correcting unit according to an embodiment of the present invention.

As illustrated in FIG. 13, the density correcting unit 260 refers to the scanner vector correction parameter (table), performs the following processes, and calculates a scanner vector correction value on for each hue (for each color component). FIG. 13 is an example of a flowchart indicating the procedures of calculating the scanner vector correction value by the density correcting unit 260.

Step S1

The density correcting unit 260 searches the LD (0 through 10) data to find the points between which the LD reference value is located.

LD data: Ldn (n indicates the "n th" LD data)
LD reference value: Ald
:
The relationship between the LD reference value and the LD data found as the result of the search is as follows.

$$Ldn-1 < Ald \leq Ldn$$

Step S2

The density correcting unit 260 obtains the scanner vector correction value for each hue (for each color component) corresponding to the LD reference value (Ald), by performing linear interpolation from the scanner vector correction parameters set with respect to Ldn−1 and Ldn.

Scanner vector correction parameter: Scv_Tn (scanner vector correction parameter with respect to "n th" LD data)

Scanner vector correction value after correction:

Scv' (scanner vector correction value used for scanner chromaticity correction)

Assuming that Ldn−Ldn−1>0, $$Scv'=0$$

is satisfied.

Assuming that Ldn−Ldn−1>0, $$Scv'=((Scv\_Tn-Scv\_Tn-1)/(Ldn-Ldn-1))*(Ald-Ldn-1)+Scv\_Tn-1$$

is satisfied.

The correction value, which is calculated until the time of starting the copy operation, is added to the above-described scanner vector (input color parameter) relevant to the γ target data for scanner chromaticity correction ACC, the operation of calculating the masking coefficient described above is performed to obtain a masking coefficient for each hue region, and the calculated masking coefficient is set in the register.

Furthermore, in the correction with respect to this scanner vector, it is assumed that a correction value multiplied by the calculated coefficient as described below, is added to the scanner vector, according to the scanner reading condition (reading method and original document type) selected as the reading method.

$$Scv'=Scv'\times(\alpha/255)$$

α: correction coefficient (0 through 510) according to scanner reading condition (reading method and original document type)

By the above calculation, it is possible to correct the difference in the scanner read value caused by the variations in the total spectral sensitivity characteristic of LED light sources that changes according to the scanner reading conditions such as the reading method and the original document type, etc. Accordingly, the color conversion (color matching with original document) can be performed with high precision.

<<Process Color Extracted for Color Adjustment and Extracted Color Component>>

Furthermore, as the color component of the image data with respect to the process color (CMY) extracted for color adjustment of the reading device 1 according to the present embodiment, a color component (RGB) is extracted. The extracted color component (RGB) becomes a maximum value after monotonously increasing, and then monotonously decreases, within the range of variations of the total spectral sensitivity characteristic of the reading device 1 that is the correction target. For example, in FIG. 14, the G component is extracted. The respective light sources of monochrome colors of the reading device 1 steeply change, and therefore a slight change in the light source characteristic affects the read value. In the present embodiment, a color component, which becomes a maximum value while increasing monotonously or decreasing monotonously, is extracted. Therefore, it is possible to perform color conversion (colorimetrical color matching with the original document that is read) upon correcting the individual differences and changes due to the passage of time in the scanner characteristics of the reading device 1.

Figure 14:
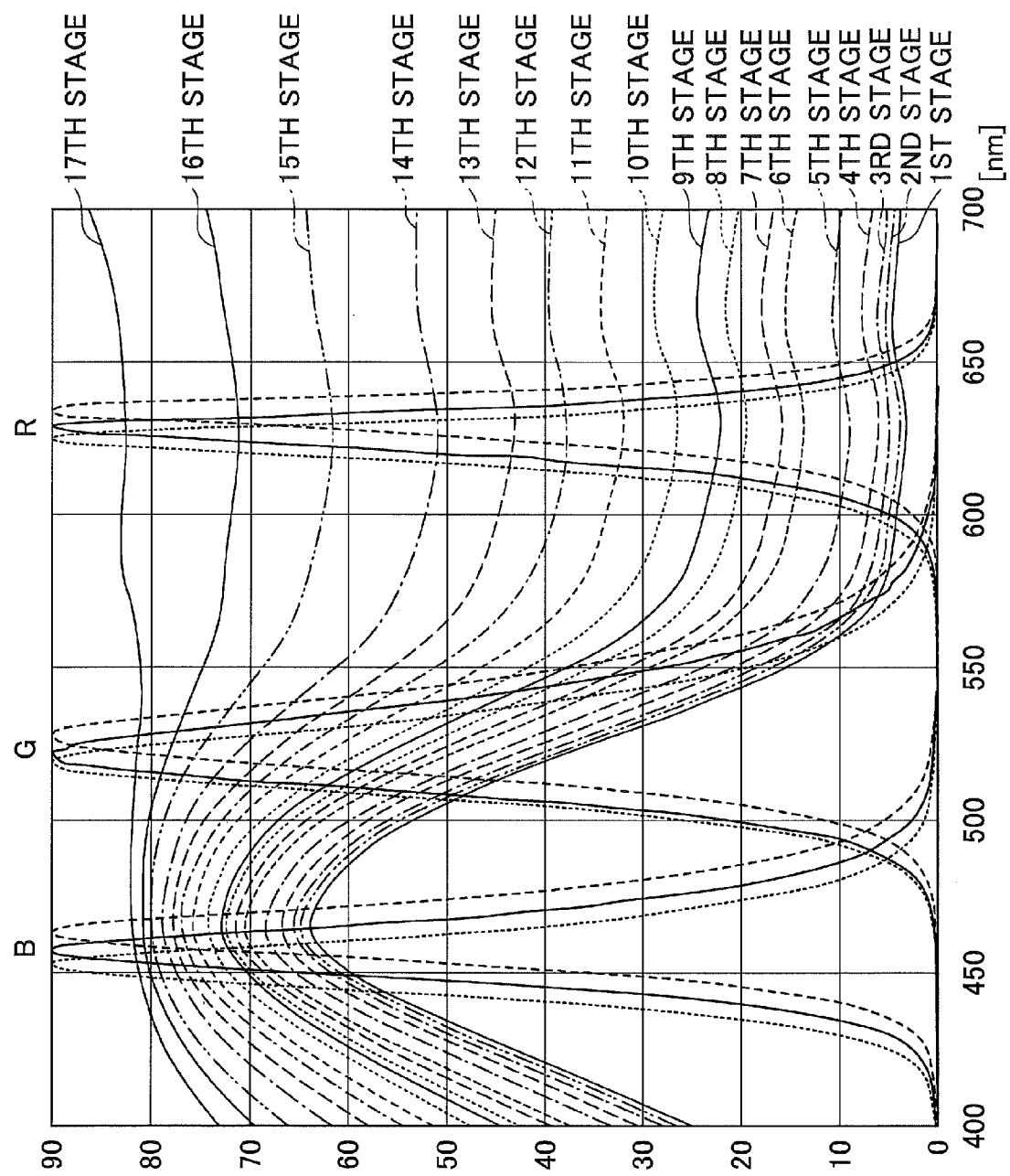
FIG. 14 is a diagram illustrating an example of spectral characteristics of an ACC pattern (cyan) and the scanner total spectral sensitivity characteristic according to an embodiment of the present invention.

FIG. 14 is a diagram illustrating an example of spectral characteristics of an ACC pattern (cyan) and the scanner total spectral sensitivity characteristic. The reading device 1 has varied characteristics in the RGB total spectral sensitivity characteristic (determined by the light sources and the color filter characteristic) and a spectral reflectance of the plotter output (in this example, the ACC pattern 21 formed by the cyan monochrome color). In this example, the scanner read value of the G component with respect to the ACC pattern 21 having high density formed by the cyan monochrome color, is extracted for performing color adjustment with respect to the variations in the G component of the reading device 1 that is the correction target.

As illustrated in FIG. 14, the spectral characteristic is changing with respect to the density variation in the process color of cyan; however, near the wavelength of the R component (the second color component), the read value of the same density of cyan is not changing with respect to the wavelength.

Furthermore, the process color (CMY) output of the plotter used for this color adjustment varies, and therefore the controller 40 corrects the output to the output density (scanner read value) obtained by performing the density correction before color adjustment as described above. In this case also, it is possible to extract the output density difference of the monotone color of the process color (CMY). Also, the controller 40 extracts, for density correction of CMY, a color component (RGB) in which the image data does not change with respect to the process color (CMY) having the same density, within the range of the total spectral sensitivity characteristic variation of the reading device 1 that is the correction target.

For example, in the image processing apparatus 100 in which the scanner has varied characteristics in the RGB total spectral sensitivity characteristic (determined mainly by the light sources and the color filter characteristic) and a spectral reflectance of the plotter output (in this example, the ACC pattern 21 formed by the cyan monochrome color) as illustrated in FIG. 14, the scanner read value of the R component with respect to the ACC pattern 21 formed by the cyan monochrome color is extracted for density detection (density correction) of the cyan monochrome color used for the color adjustment described above. This is because, in FIG. 14, even if the characteristic of the R component shifts within the range of variations of the total spectral sensitivity characteristic, the spectral reflectance characteristic of cyan within the frequency range is flat, and the read value of cyan, having the same density, obtained from the value of integral of the spectral reflectance and the total spectral sensitivity characteristic of the scanner, does not change.

That is, if the plotter device 9 is fixed, there are no variations in the spectral reflectance characteristic corresponding to the output density of the monochrome process color (CMY) formed by the plotter device 9. Therefore, by detecting the scanner read value of the printed monochrome process color (difference between reference scanner and read value), it is possible to estimate the variations in the total spectral sensitivity characteristic (for example, the shift amount in the peak frequency of the RGB total sensitivity). Furthermore, the color conversion parameter for scanner output with respect to the color region affected by the difference in color reading by the reading device 1, can be adjusted with high precision.

<Overall Operations>

Figure 15:
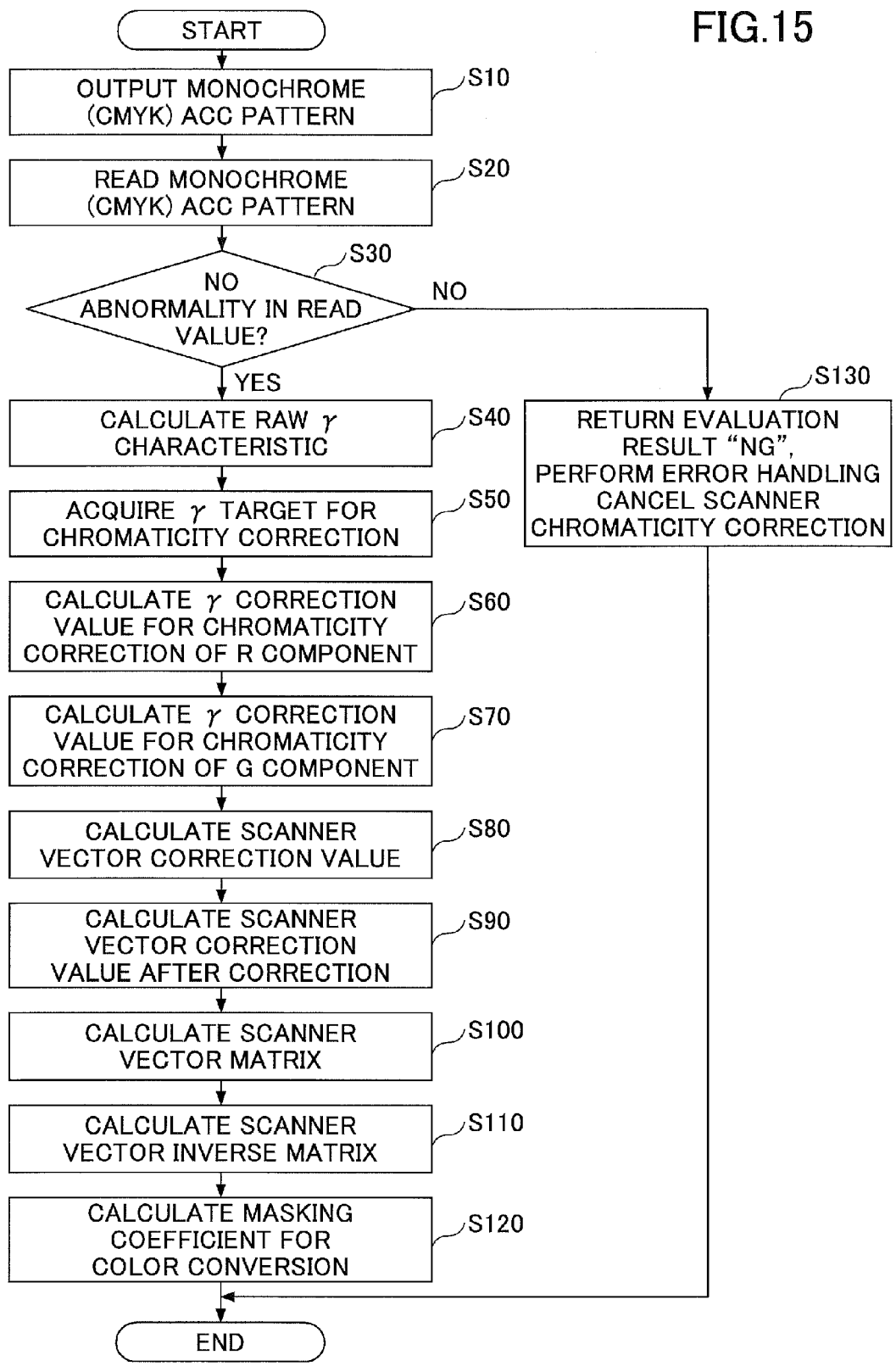
FIG. 15 is an example of a flowchart indicating the operation procedures of the image processing apparatus according to an embodiment of the present invention.

FIG. 15 is an example of a flowchart indicating the operation procedures of the image processing apparatus 100. The process of FIG. 15 is started when the user performs the calibration of the reading device 1.

Step S10: First, the plotter device 9 forms the ACC pattern 21 of the monochrome process color (CMY) on a recording sheet, and outputs the recording sheet on which the ACC pattern 21 has been formed. This ACC pattern 21 has not been subjected to color measurement (not managed). Said differently, it is not known how much the respective CMYK components are expressed in this ACC pattern 21.

Step S20: Next, the reading device 1 reads the ACC pattern 21 of the monochrome process color (CMY) on the recording sheet. For example, it is assumed that the reading device 1 reads cyan, and acquires the R components.

Step S30: The controller 40 determines whether there is an abnormality in the scanner read value. The determination of whether there is an abnormality in the scanner read value is made, for example, by determining whether it is possible to detect the respective CMY components and whether there is a predetermined number (17 patches) of patches.

Step S130: When there is an abnormality in the scanner read value, the controller 40 outputs an evaluation result indicating NG to the operation unit 130, and cancels the scanner chromaticity correction as an error handling process.

Step S40: When there is no abnormality in the scanner read value, the controller 40 calculates a Raw γ characteristic as illustrated in FIG. 12.

Figure 16:
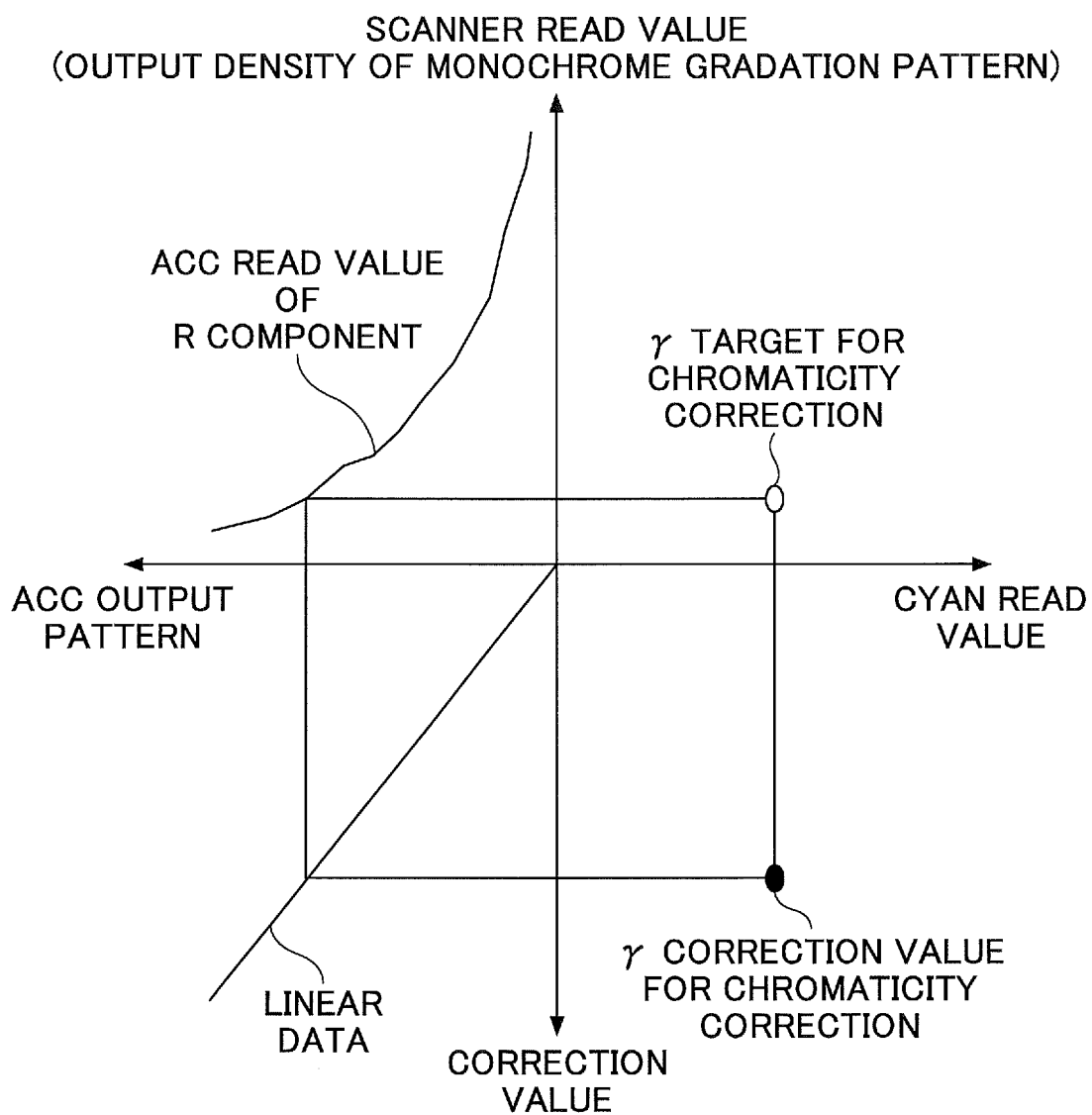
FIG. 16 is an example of a diagram for describing the calculation of a γ target for chromaticity correction by using the Raw γ characteristic according to an embodiment of the present invention.

Step S50: Next, the density correcting unit 260 of the controller 40 acquires the γ target for chromaticity correction. FIG. 16 is an example of a diagram for describing the calculation of a γ target for chromaticity correction by using the Raw γ characteristic. The γ target for chromaticity correction is, for example, the density of cyan having the flat part in FIG. 14. The controller 40 acquires the patch data of a predetermined density that is determined in advance among the scanner read values of cyan. The controller 40 calculates the γ correction value for chromaticity correction via the linear data, by using the ACC read value (Raw γ characteristic) of FIG. 12, from the γ target for scanner chromaticity correction.

Figure 17:
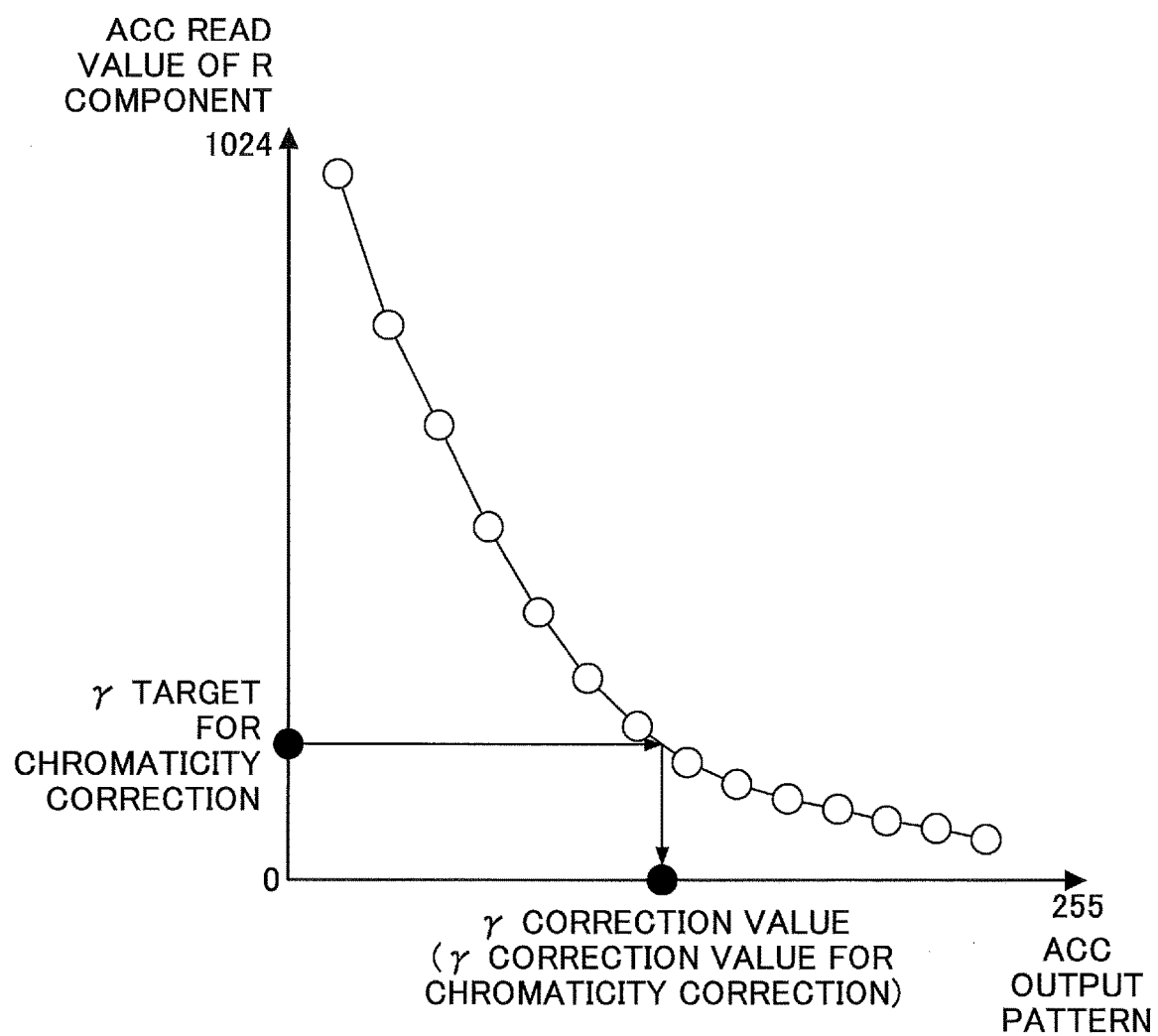
FIG. 17 is an example of a graph for describing the calculation of the γ correction value for chromaticity correction of the R component according to an embodiment of the present invention.

Step S60: As illustrated in the second quadrant of FIG. 16, the density correcting unit 260 calculates the γ correction value for chromaticity correction of the R component corresponding to the γ target for chromaticity correction. FIG. 17 is an example of a graph for describing the calculation of the γ correction value for chromaticity correction of the R component. Because the γ target for chromaticity correction is known, it is possible to calculate the γ correction value for chromaticity correction. Note that it is assumed that the ACC read value (Raw γ characteristic) of FIG. 17 is created in advance.

Figure 18:
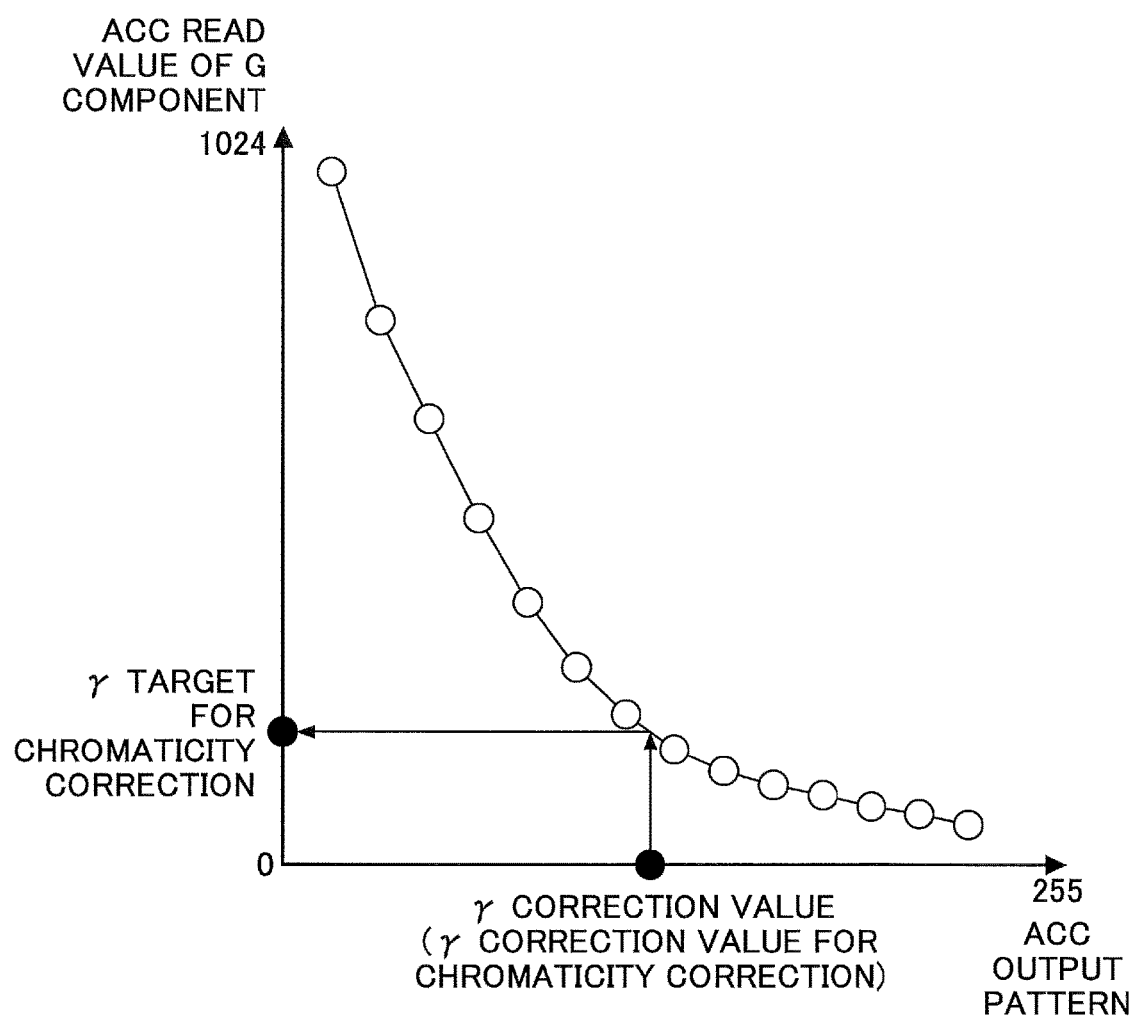
FIG. 18 is an example of a graph for describing the calculation of an ACC read correction value of the G component according to an embodiment of the present invention.

Step S70: Next, the density correcting unit 260 calculates the γ correction value for chromaticity correction of the G component corresponding to the γ correction value for chromaticity correction of the R component. FIG. 18 is an example of a graph for describing the calculation of the γ correction value for chromaticity correction of the G component. As described above, one of the features is to calculate the γ correction value for chromaticity correction of the G component from the γ correction value of the R component (γ correction value for chromaticity correction). This is because, as the density of cyan is flat in the wavelength area of the R component as described above, even if the wavelength of the R component in the light source of the reading device 1 varies, the scanner read value of the R component with respect to the density data of cyan is almost unaffected. Note that it is assumed that the ACC read value (Raw γ characteristic) of FIG. 18 is created in advance.

Step S80: Next, the density correcting unit 260 calculates the scanner vector correction value. Because the ACC reading correction value has been calculated, the difference with the reference value is calculated. That is, the LD reference value is calculated from the following formula LD reference value=γ correction value for scanner chromaticity correction (present value)−γ correction value for scanner chromaticity correction (reference value)

The γ correction value for scanner chromaticity correction (present value) corresponds to the ACC reading correction value calculated in step S70. Furthermore, the γ correction value for scanner chromaticity correction (reference value) is the G component obtained when reading the cyan patch having the density defined in advance by the reading device 1 that is the reference.

Step S90: Accordingly, the LD reference value is known, and therefore a chromaticity variation estimating unit 250 (see FIG. 5) corrects the scanner vector. That is, the chromaticity variation estimating unit 250 performs linear interpolation on any of the scanner vector correction values of LD 0 through LD 10 of table 1 that have been determined by the LD reference value, and calculates a scanner vector correction value (Scv') after correction. Furthermore, the Scv", which is corrected by the coefficient α, is preferably calculated.

Step S100: The hue division masking unit 230 calculates a scanner vector matrix. That is, a matrix, in which a printer vector is set to the left side of formula (1), is calculated.

Step S110: The hue division masking unit 230 calculates a scanner vector inverse matrix. That is, a matrix, in which a scanner vector corrected by the scanner vector correction value is set to the right side of formula (1), is created, and an inverse matrix of the created matrix is calculated.

Step S120: Next, the hue division masking unit 230 calculates the product of the matrix obtained in step S100 and the inverse matrix obtained in step S110, to calculate a masking coefficient for color conversion. The scanner vector is corrected into a printer vector by this masking coefficient for color conversion, and therefore it is possible to correct the reading characteristics of image data formed on a recording sheet, even when there are varied characteristics in the components included in the color image scanner and changes in the components due to the passage of time.

As described above, in the present embodiment, it is possible to perform γ correction in which the variations in the total spectral sensitivity characteristic are reduced, even by using an ACC pattern in which colors are not managed.

Other Application Examples

The image processing apparatus, the image processing method, and the recording medium are not limited to the specific embodiments described in the detailed description, and variations and modifications may be made without departing from the spirit and scope of the present invention.

For example, the configuration example of FIG. 5, etc., is divided according to the main functions in order to facilitate the understanding of the processes by the reading device 1. The present invention is not limited by the way of dividing the processing units or the names of the units. Furthermore, the processes by the reading device 1 may be further divided into more processing units according to the process contents. Furthermore, one processing unit may be divided to include even more processes.

Furthermore, the controller 40 may be present in a network. In this case, the read values obtained by reading the ACC pattern by the reading device 1 are sent to a server, and the server calculates the masking coefficient for color conversion by using the read values of the ACC pattern.

Furthermore, in the above embodiment, the processes by the image processing apparatus 100 are described; however, an information processing apparatus may perform the color conversion, and the image data that has been subjected to color conversion may be output on a recording sheet by the image processing apparatus 100. In this case, the information processing apparatus executes a program and executes a process as illustrated in FIG. 15. Note that examples of the information processing apparatus are the PC 16 and a server.

Furthermore, the above embodiment describes the correction of the spectral characteristic of the reading device 1 such as a scanner; however, the above embodiment may be applied to the correction of the spectral characteristic of a CCD camera or a complementary metal-oxide semiconductor (CMOS) camera.

According to one embodiment of the present invention, an image processing system, by which color correction can be performed without using a reference chart in which colors are not managed, can be provided.

What is claimed is:

1. An image processing apparatus for performing color adjustment based on an original document read by a reading device, the image processing apparatus comprising:
a processor that is configured to:
acquire image data that is generated as the reading device reads a gradation pattern formed on a recording sheet;

extract, from the image data, a color component by which a read value of a process color changes according to variations in a total spectral sensitivity characteristic of the reading device, and correct a read value of the color component to a reference density; and perform the color adjustment on the color component, based on a difference between the read value of the color component that has been corrected to the reference density and a read value that is a reference of the reading device, wherein the processor is further configured to:

extract a second color component having a wavelength, by which a read value of the image data changes with respect to a density variation in the process color and by which the read value of the image data does not change with respect to the process color having the same density, and perform γ conversion on a read value of a density of the process color set in advance, by a Raw γ characteristic of the second color component, and perform γ conversion on the read value, which has been subjected to the γ conversion by the Raw γ characteristic of the second color component, by a Raw γ characteristic of the color component extracted by the density corrector.

2. The image processing apparatus according to claim 1, wherein the color component, which is extracted by the density corrector, monotonously increases and subsequently reaches a maximum value and then monotonously decreases, within a range of the variations in the total spectral sensitivity characteristic of the reading device that is a correction target.

3. The image processing apparatus according to claim 1, wherein the possessor is further configured to multiply a correction value, which is set according to the difference, by a coefficient according to a reading condition including a reading method of the reading device and a type of the original document, and add the correction value, which has been multiplied by the coefficient, to the image data, to perform the color adjustment.

4. An image processing method performed by an image processing apparatus for performing color adjustment based on an original document read by a reading device, the image processing method comprising:

acquiring image data that is generated as the reading device reads a gradation pattern formed on a recording sheet;

extracting, from the image data, a color component by which a read value of a process color changes according to variations in a total spectral sensitivity characteristic of the reading device, and correcting a read value of the color component to a reference density; and performing the color adjustment on the color component, based on a difference between the read value of the color component that has been corrected to the reference density and a read value that is a reference of the reading device, wherein the image processing method further comprises:

extracting a second color component having a wavelength, by which a read value of the image data changes with respect to a density variation in the process color and by which the read value of the image data does not change with respect to the process color having the same density, and performing γ conversion on a read value of a density of the process color set in advance, by a Raw γ characteristic of the second color component, and performing γ conversion on the read value, which has been subjected to the γ conversion by the Raw γ characteristic of the second color component, by a Raw γ characteristic of the color component extracted by the density corrector.

5. A non-transitory computer-readable recording medium storing a program that causes a computer to execute a process performed in an information processing apparatus for performing color adjustment based on an original document read by a reading device, the process comprising:

acquiring image data that is generated as the reading device reads a gradation pattern formed on a recording sheet;

extracting, from the image data, a color component by which a read value of a process color changes according to variations in a total spectral sensitivity characteristic of the reading device, and correcting a read value of the color component to a reference density; and performing the color adjustment on the color component, based on a difference between the read value of the color component that has been corrected to the reference density and a read value that is a reference of the reading device, wherein the process further comprises:

extracting a second color component having a wavelength, by which a read value of the image data changes with respect to a density variation in the process color and by which the read value of the image data does not change with respect to the process color having the same density, and performing γ conversion on a read value of a density of the process color set in advance, by a Raw γ characteristic of the second color component, and performing γ conversion on the read value, which has been subjected to the γ conversion by the Raw γ characteristic of the second color component, by a Raw γ characteristic of the color component extracted by the density corrector.

* * * * *